United States Patent
Yasumura

(10) Patent No.: US 7,286,374 B2
(45) Date of Patent: Oct. 23, 2007

(54) SWITCHING POWER SUPPLY CIRCUIT

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/449,209

(22) Filed: Jun. 8, 2006

(65) Prior Publication Data

US 2006/0285367 A1    Dec. 21, 2006

(30) Foreign Application Priority Data

Jun. 8, 2005    (JP) ............................ P2005-168594

(51) Int. Cl.
    *H02M 3/335*    (2006.01)
(52) U.S. Cl. .................................... 363/21.02; 363/97
(58) Field of Classification Search .................. 363/16, 363/21.01, 21.02, 21.03, 97; 323/250, 251
See application file for complete search history.

(56) References Cited

U.S. PATENT DOCUMENTS

| | | | |
|---|---|---|---|
| 4,128,868 A | 12/1978 | Gamble | |
| 5,274,543 A | 12/1993 | Loftus, Jr. | |
| 6,285,567 B1 | 9/2001 | Kennedy | |
| 6,310,792 B1 | 10/2001 | Drobnik | |
| 6,366,476 B1 | 4/2002 | Yasumura et al. | |
| 6,483,721 B2 | 11/2002 | Terashi | |
| 6,515,875 B2 | 2/2003 | Yasumura et al. | |
| 6,583,999 B1 | 6/2003 | Spindler et al. | |
| 6,654,259 B2 | 11/2003 | Koshita et al. | |
| 6,687,137 B1 | 2/2004 | Yasumura et al. | |
| 6,831,846 B2 | 12/2004 | Yasumura et al. | |
| 6,930,893 B2 | 8/2005 | Vinciarelli | |
| 6,934,167 B2 | 8/2005 | Jang et al. | |
| 7,054,167 B2 | 5/2006 | Yasumura et al. | |
| 2007/0035971 A1* | 2/2007 | Yasumura | 363/21.02 |
| 2007/0086219 A1* | 4/2007 | Yasumura | 363/21.02 |

FOREIGN PATENT DOCUMENTS

| | | |
|---|---|---|
| JP | 06-327246 A | 11/1994 |
| JP | 2000-134925 A | 5/2000 |
| JP | 2000-152617 A | 5/2000 |
| JP | 2003-235259 A | 8/2003 |
| JP | 2004-194105 A | 7/2004 |

* cited by examiner

*Primary Examiner*—Jessica Han
(74) *Attorney, Agent, or Firm*—Lerner, David, Littenberg, Krumholz & Mentlik, LLP

(57) ABSTRACT

The invention aims at putting a single ended resonance type converter capable of obtaining a ZVS operation over an overall corresponding load region to practical use. A switching power supply circuit includes a primary side switching converter of a class-E resonance type, and a choke coil of a primary side series resonance circuit of the class-E resonance type converter is used as a primary winding of an insulating converter transformer. With this structure, a choke coil winding to be inserted into an input line of a DC input voltage is arranged between a positive-polarity end portion of a smoothing capacitor, and a node between the primary winding and a primary side series resonance capacitor. Thus, a resonance pulse voltage generated in the choke coil winding is superimposed on an AC voltage in the primary winding. Also, a primary series resonance current is caused to separately flow through the choke coil winding.

10 Claims, 16 Drawing Sheets

US 7,286,374 B2

SWITCHING POWER SUPPLY CIRCUIT

CROSS-REFERENCE TO RELATED APPLICATIONS

The present application claims priority from Japanese Patent Application No. JP 2005-168594 filed on Jun. 8, 2005, the disclosure of which is hereby incorporated by reference herein.

BACKGROUND OF THE INVENTION

The present invention relates to a switching power supply circuit including a voltage resonance type converter.

A current resonance type switching power source and a voltage resonance type switching power source are generally known as the so-called soft-switching power source adopting a resonance type. In the present circumstances, a current resonance type converter using a half-bridge coupling system having two switching elements is widely adopted with easiness of its practical application as a background.

However, at the present time, for example, the characteristics of a high withstanding voltage switching element have been improved. Thus, a problem about a withstand voltage when the voltage resonance type converter is put to practical use has been cleared. In addition, it is also known that the voltage resonance type converter structured using a single ended system having one switching element is advantageous in terms of an input feedback noise, a noise component on a DC output voltage line, and the like as compared with a current resonance type forward converter including one switching element.

FIG. 21 shows one structural example of a switching power supply circuit including the voltage resonance type converter using the single ended system. This switching power supply circuit is disclosed in Japanese Patent Laid-open 2000-134925.

In the switching power supply circuit shown in FIG. 21, an AC voltage from a commercial AC power source AC is rectified and smoothed by a rectifying and smoothing circuit including a bridge rectifying circuit Di and a smoothing capacitor Ci. As a result, a rectified and smoothed voltage Ei is generated as a voltage developed across the smoothing capacitor Ci.

At that, a noise filter is provided for the line of the commercial AC power source AC. The noise filter includes a set of common mode choke coils CMC, and two across capacitors CL and serves to remove a common mode noise.

The rectified and smoothed voltage Ei is inputted as a DC input voltage to a voltage resonance type converter. The voltage resonance type converter, as described above, adopts a structure using the single ended system including one switching element Q1. In addition, the voltage resonance type converter in this case is one using a separate excitation system in which the switching element Q1 constituted by a MOS-FET is switching-driven by an oscillation/drive circuit 2.

A body diode DD of the MOS-FET is connected in parallel with the witching element Q1. In addition, a primary side parallel resonance capacitor Cr is connected in parallel between a drain and a source of the switching element Q1.

The primary side parallel resonance capacitor Cr forms, together with a leakage inductance L1 of a primary winding N1 of an insulating converter transformer PIT, a primary side parallel resonance circuit (voltage resonance circuit). A voltage resonance type operation as a switching operation of the switching element Q1 is obtained by the primary side parallel resonance circuit.

The oscillation/drive circuit 2 applies a gate voltage as a drive signal to a gate of the switching element Q1 to switching-drive the switching element Q1. As a result, the switching element Q1 performs a switching operation at a switching frequency corresponding to a period of the drive signal.

The insulating converter transformer PIT transmits a switching output from the switching element Q1 to its secondary side.

The insulating converter transformer PIT, for example, includes an EE letter-like core in which two E letter-like cores made of a ferrite material are combined with each other in terms of a structure thereof. After a winding portion is divided between the primary side and the secondary side, the primary winding N1 and a secondary winding N2 are wound around a central magnetic leg of the EE letter-like core.

In this case, a gap having a gap length of about 1.0 mm is formed in the central magnetic leg of the EE letter-like core of the insulating converter transformer PIT. As a result, a coupling coefficient k of about 0.8 to about 0.85 is obtained between the primary side and the secondary side. A saturated state becomes difficult to obtain all the more because the coupling coefficient k of this degree is regarded as loose coupling in terms of the degree of coupling. In addition, a value of the coupling coefficient k becomes a setting factor for a leakage inductance (L1).

One end of the primary winding N1 of the insulating converter transformer PIT is inserted between the switching element Q1 and a positive-polarity terminal of the smoothing capacitor Ci, which results in that the switching output from the switching element Q1 is transmitted. An AC voltage which is induced by the primary winding N1 is generated in the secondary winding N2 of the insulating converter transformer PIT.

In this case, a secondary side series resonance capacitor C2 is connected in series with one end of the secondary winding N2, whereby a leakage inductance L2 of the secondary winding N2 and a capacitance of the secondary side series resonance capacitor C2 form a secondary side series resonance circuit (current resonance circuit).

In addition, rectifying diodes Do1 and Do2, and a smoothing capacitor Co are connected to a secondary side series resonance circuit as shown in FIG. 21, thereby structuring a voltage doubler half-wave rectifying circuit. The voltage doubler half-wave rectifying circuit generates a secondary side DC output voltage Eo at a level which is double as large as that of an AC voltage V2 induced in the secondary winding N2 in terms of a voltage developed across the smoothing capacitor Co. The secondary side DC output voltage Eo is supplied to a load and is inputted as a detection voltage for a constant voltage control to a control circuit 1.

The control circuit 1 inputs a detection output which is obtained by detecting the level of the secondary side DC output voltage Eo inputted thereto as the detection voltage to the oscillation/drive circuit 2.

The oscillation/drive circuit 2 outputs a drive signal a frequency of which is made variable in correspondence to the level of the secondary side DC output voltage Eo indicated by the detection signal inputted thereto. Thus, the oscillation/drive circuit 2 controls the switching operation of the switching element Q1 so that the secondary side DC output voltage Eo becomes constant at a predetermined level. As a result, the stabilization control for the secondary side DC output voltage Eo is carried out.

FIGS. 22A, 22B and 22C, and FIG. 23 show results of experiments on the power supply circuit having the structure shown in FIG. 21. At that, when the experiments were performed, the setting was made for the main portions of the power supply circuit shown in FIG. 21 as follows.

In the insulating converter transformer PIT, EER-35 was selected for a core, and a gap having a gap length of 1 mm was set in the central magnetic leg. In addition, the number T of turns of the primary winding N1, and the number T of turns of the secondary winding N2 were set to 39T and 23T, respectively. Also, an induced voltage level per one turn (T) of the secondary winding N2 was set to 3V/T. The coupling coefficient k of the insulating converter transformer PIT was set to 0.81.

In addition, a capacitance of the primary side parallel resonance capacitor Cr was selected as 3,900 pF, and a capacitance of the secondary side series resonance capacitor C2 was selected as 0.1 μF. As a result, a resonance frequency fo1 of the primary side parallel resonance circuit, and a resonance frequency fo2 of the secondary side series resonance circuit were set as 230 kHz and 82 kHz, respectively. In this case, a relative relationship between the resonance frequencies fo1 and fo2 can be expressed by fo1≈2.8×fo2.

A rated level of the secondary side DC output voltage Eo is 135 V. A corresponding load power ranges from a maximum load power Pomax=200 W to a minimum load power Pomin=0 W.

FIGS. 22A, 22B and 22C are waveform charts showing operations of the main portions in the power supply circuit shown in FIG. 21 based on a switching period of the switching element Q1. That is to say, FIG. 22A shows waveforms of a voltage V1, a switching current IQ1, a primary winding current I1, a secondary winding current I2, and secondary side rectified currents ID1 and ID2 during a phase of the maximum load power Pomax=200 W. FIG. 22B shows waveforms of the voltage V1, the switching current IQ1, the primary winding current I1, and the secondary winding current I2 during a phase of an intermediate load power Po=120 W. Also, FIG. 22C shows waveforms of the voltage V1 and the switching current IQ1 during a phase of the minimum load power Pomin=0 W.

The voltage V1 is one that is developed across the switching element Q1. That is to say, the voltage V1 has a waveform in which the voltage V1 is set at a 0 level during an ON-time period TON for which the switching element Q1 is in an ON state, and turns into a sine-wave resonance pulse for an OFF-time period TOFF for which the switching element Q1 is in an OFF state. Thus, the resonance pulse waveform of the voltage V1 shows that the operation of the primary side switching converter is of the voltage resonance type.

The switching current IQ1 is a current which is caused to flow through the switching element Q1 (and the body diode DD). That is to say, the switching current IQ1 is caused to flow during the ON-time period TON so as to show the waveform of e.g., FIG. 22A, and is at a 0 level during the OFF-time period TOFF.

The primary winding current I1 which is caused to flow through the primary winding N1 is obtained by composing a current component which is caused to flow as the above-mentioned switching current IQ1 during the ON-time period TON, and a current which is caused to flow through the primary side parallel resonance capacitor Cr during the OFF-time period TOFF with each other.

In addition, while illustrated only in FIG. 22A, the rectified currents ID1 and ID2 which show the operation of the secondary side rectifying circuit and which are caused to flow through the rectifying diodes Do1 and Do2 have sine-wave waveforms as shown in the figure, respectively. In this case, the resonance operation of the secondary side series resonance circuit dominantly appears in the waveform of the rectified current ID1 rather than in the waveform of the rectified current ID2.

The secondary winding current I2 which is caused to flow through the secondary winding N2 is obtained by composing the rectified currents Id1 and ID2 with each other.

FIG. 23 shows a switching frequency fs against load fluctuation, the ON-time period TON and OFF-time period TOFF of the switching element Q1, and an efficiency ηAC→DC of converting an AC power to a DC power in the power supply circuit shown in FIG. 21.

Firstly, looking at the efficiency ηAC→DC of converting an AC power to a DC power, it is understood that the high efficiency of 90% or more is obtained in a wide range of the load power Po from 50 W to 200 W. The inventor of this application has formerly confirmed from the experiments that such characteristics are obtained when the voltage resonance type converter using the single ended system is combined with the secondary side series resonance circuit.

In addition, the switching operation representing the constant voltage control characteristics against the load fluctuation caused in the power supply circuit shown in FIG. 21 is shown based on the switching frequency fs, the ON-time period TON and the OFF-time period TOFF of FIG. 23. In this case, the switching frequency fs is nearly constant against the load fluctuation. On the other hand, the ON-time period TON and the OFF-time period TOFF linearly change so as to show tendencies opposite to each other as shown in FIG. 23. This fact shows that after the switching frequency (switching period) is made nearly constant against the fluctuation of the secondary side DC output voltage Eo, the switching operation is controlled so that a time period ratio of the ON-time period to the OFF-time period is changed. Such control can be regarded as pulse width modulation (PWM) control for making the ON/OFF-time period within one period variable. In the power supply circuit shown in FIG. 21, the secondary side DC output voltage Eo is stabilized by the PWM control.

FIG. 24 schematically shows the constant voltage control characteristics of the power supply circuit shown in FIG. 21 based on a relationship between the switching frequency fs (kHz) and the secondary side DC output voltage Eo.

The power supply circuit shown in FIG. 21 includes the primary side parallel resonance circuit and the secondary side series resonance circuit. Hence, the power supply circuit shown in FIG. 21 compoundly has two resonance impedance characteristics, i.e., resonance impedance characteristics corresponding to a resonance frequency fo1 of the primary side parallel resonance circuit, and resonance impedance characteristics corresponding to a resonance frequency fo2 of the secondary side series resonance circuit. In addition, the power supply circuit shown in FIG. 21 has a relationship of fo1≈2.8×fo2. Hence, as shown in FIG. 24 as well, the secondary side series resonance frequency fo2 is lower than the primary side parallel resonance frequency fo1.

Then, there is supposed the constant voltage control characteristics for the switching frequency fs under the condition of a certain AC input voltage VAC. In this case, as shown in the figure, the constant voltage control characteristics during the maximum load power Pomax phase and during the minimum load power Pomin phase under the resonance impedance corresponding to the resonance frequency fo1 of the primary side parallel resonance circuit are represented by characteristic curves A and B, respectively. Also, the constant voltage control characteristics during the maximum load power Pomax phase and during the minimum load power Pomin phase under the resonance impedance corresponding to the resistance frequency fo2 of the secondary side series parallel circuit are represented by characteristic curves C and D, respectively. When the constant voltage control is intended to be performed based on a rated level tg of the secondary side DC output voltage Eo under the characteristics shown in FIG. 24, a variable range (necessary control range) of the switching frequency fs required for the constant voltage control can be expressed as a section indicated by Δfs.

The necessary control range Δfs shown in FIG. 24 ranges from the characteristic curve C during the maximum load power Pomax phase corresponding to the resonance frequency fo2 of the secondary side series resonance circuit to, the characteristic curve B during the minimum load power Pomin phase corresponding to the resonance frequency fo1 of the primary side parallel resonance circuit. Thus, the necessary control range Δfs strides across the characteristic curve D during the minimum load Pomin phase corresponding to the resonance frequency fo2 of the secondary side series resonance circuit and the characteristic curve A during the maximum load power Pomax phase corresponding to the resonance frequency fo1 of the primary side parallel resonance circuit.

For this reason, as for the constant voltage control operation of the power supply circuit shown in FIG. 21, the switching drive control is carried out based on a state of the PWM control in which the time period ratio of the ON-time period to the OFF-time period for one switching period is changed after the switching frequency fs is nearly fixed. At that, this is also shown based on a situation in which the widths of the OFF-time period TOFF and ON-time period TON change under such a condition that the time period lengths of one switching period (TOFF+TON) shown in the phase of the maximum load power Pomax=200 W, the phase of the load power Po=100 W, and the phase of the minimum load power Pomin=0 W shown in FIGS. 22A, 22B and 22C, respectively, are made nearly constant.

It is thought that such an operation is obtained by making a change between a first state and a second state under the narrow variable range (Δfs) of the switching frequency. In the first state, the resonance impedance (capacitive impedance) having the resonance frequency fo1 of the primary side parallel resonance circuit becomes dominant in terms of the resonance impedance characteristics corresponding to the load fluctuation in the power supply circuit. Also, in the second state, the resonance frequency fo2 (inductive impedance) of the secondary side series resonance circuit becomes dominant in terms of these resonance impedance characteristics.

However, the power supply circuit shown in FIG. 21 involves the problem as will be described below.

That is to say, the switching current IQ1 during the maximum load power Pomax phase shown in FIG. 22A which has been formerly described is held at the 0 level until an end point of the OFF-time period TOFF as the turn-ON timing is reached. When the ON-time period TON is reached, firstly, the negative-polarity current is caused to flow through the body diode DD, and thereafter is inversed in polarity to be caused to flow through the drain and source of the switching element Q1. In such a manner, the power supply circuit operates. This operation shows a state in which a zero voltage switching (ZVS) is properly carried out.

On the other hand, for the switching current IQ1 during the phase of the load power Po=120 W corresponding to the intermediate load, the operation is obtained in which the switching current IQ1 is caused to flow in the form of noises at the timing at and before the end point of the OFF-time period as the turn-ON timing is reached. This operation is an abnormal operation in which no ZVS is properly carried out.

That is to say, it has been found out that the voltage resonance type converter including the secondary side series resonance circuit, as shown in FIG. 21, performs the abnormal operation in which no ZVS is properly carried out during the intermediate load phase. It has been confirmed that the power supply circuit shown in FIG. 21, for example, actually performs such an abnormal operation in a region of a load fluctuation range as a section A shown in FIG. 23.

As has been formerly described, the voltage resonance type converter including the secondary side series resonance circuit essentially has a tendency to show the characteristics with which the high efficiency can be satisfactorily maintained against the load fluctuation. However, as shown in terms of the switching current IQ1 of FIG. 22B, the adequate peak current is caused to flow at the turn-ON phase of the switching element Q1. Hence, an increase in switching loss is caused, which results in that the voltage resonance type converter carries a factor of reducing the power conversion efficiency.

In addition, in any case, causing the abnormal operation as described above results in that the phase-gain characteristics of the constant voltage control circuit system, for example, are shifted, and thus the switching operation is performed in the abnormal oscillation state. For this reason, it is strongly recognized under the existing circumstances that it is actually difficult to put the voltage resonance type converter including the secondary side series resonance circuit to practical use.

SUMMARY OF THE INVENTION

In consideration of the above-mentioned problems, according to an aspect of the present invention, there is provided a switching power supply circuit, including a rectifying and smoothing circuit including a rectifying element and a smoothing capacitor, the rectifying element rectifying an AC voltage input from a commercial AC power source to produce a rectified voltage, and the smoothing capacitor smoothing the rectified voltage to generate a rectified and smoothed voltage as a voltage across the smoothing capacitor; a switching element for receiving the rectified and smoothed voltage as a DC input voltage to perform a switching operation; a switching driving section operable to drive the switching element to perform the switching operation; a first inductor disposed in a path through which the rectified and smoothed voltage is input to the switching element; a first primary side series resonance circuit for performing a resonance operation in correspondence with the switching operation performed by the switching element, the first primary side series resonance circuit including an inductance of a second inductor and a capacitance of a primary side series resonance capacitor connected in series with the inductance of the second inductor; a second primary side series resonance circuit for performing a resonance operation in correspondence with the switching operation performed by the switching element, the second primary side series resonance circuit including an inductance of the first inductor and the capacitance of the primary side series resonance capacitor connected in series with the inductance of the first inductor; a first primary side parallel resonance circuit for performing a resonance operation in correspondence with the switching operation performed by the switching element, the first primary side parallel resonance circuit including the inductance of the first inductor, the inductance of the second inductor connected in series with the inductance of the first inductor, and a capacitance of a primary side parallel resonance capacitor connected in parallel with a series connection circuit including the first inductor and the second inductor; a converter transformer having a core with a primary winding on a primary side and a secondary winding on a secondary side, the primary winding being formed by the second inductor, the secondary winding having an AC voltage induced therein by the primary winding, a coupling coefficient between the primary side and the secondary side being set for loose coupling; and a secondary side DC output voltage generating section operable to perform a rectifying operation on the AC voltage induced in the secondary winding of the converter transformer and input to the secondary side DC output voltage generating section to thereby generate a secondary side DC output voltage.

At that, in the present invention, the "coupling coefficient" represents the degree of the electromagnetic coupling. A numeric value of 1 represents the highest degree of the coupling, and a numeric value of 0 represents the lowest degree of the coupling (non-coupling).

In the power supply circuit configured as described above, a circuit form as a class-E switching converter is formed on the primary side. The class-E switching converter includes, as a basic structure, the first inductor, the second inductor, the primary side parallel resonance capacitor, and the primary side series resonance capacitor on the primary side. Thus, the class-E switching converter is one form of a soft switching converter which is called a compound resonance type and which includes a parallel resonance circuit (primary side parallel resonance circuit) and a series resonance circuit (primary side series resonance circuit). Then, an inductor (second inductor) forming the series resonance circuit (primary side series resonance circuit) is used as the primary winding of the converter transformer, thereby forming a power supply circuit which is capable of performing DC-DC power conversion.

In such a manner, the power supply circuit having the class-E switching converter applied thereto is basically configured. As a result, the problems concerning voltage resonance type converters and causing abnormal operation in which no zero voltage switching (ZVS) operation can be obtained under an intermediate load condition is excluded, thereby obtaining the proper ZVS operation.

In addition, in the present invention, the class-E switching converter on the primary side receives as its input the rectified and smoothed voltage as the voltage developed across the smoothing capacitor forming the rectifying and smoothing circuit for rectifying and smoothing the AC voltage from the commercial AC power source and performs the switching operation. At this time, a current caused to flow from the smoothing capacitor into the class-E switching converter is caused to flow through the switching element side via the first inductor constituting the primary side parallel resonance circuit, thereby becoming a DC current.

In addition, in the present invention, the power supply circuit includes at least the first primary side series resonance circuit, the second primary side series resonance circuit, and the first primary side parallel resonance circuit as the constituent elements described above. With such a structure, firstly, when a resonance pulse voltage is generated in the first inductor based on the resonance operation of the first primary side parallel resonance circuit, the resonance pulse voltage is superimposed on the AC voltage generated in the primary winding. As a result, the level of the primary winding voltage increases. In addition, a resonance current caused to flow through the primary winding (second inductor) of the converter transformer is caused to separately flow through the first inductor as well based on resonance operations of the first and second primary side parallel resonance circuits. As a result, the amount of current caused to flow through the primary winding is reduced.

The current caused to flow through the primary side switching converter is reduced all the more since the level of the primary winding voltage increases and the amount of current of the primary winding is reduced in such a manner. Such reduction in amount of current results in a reduction in the power loss in the power supply circuit.

According to another embodiment of the present invention, there is provided a switching power supply circuit, including a switching element operable to receive a DC input voltage and to perform a switching operation; a switching driving section operable to drive the switching element to perform the switching operation; a first inductor and a second inductor arranged in series with a path through which the DC input voltage is input to the switching element; a first primary side series resonance circuit and a second primary side series resonance circuit for performing resonance operations in correspondence with the switching operation performed by the switching element, the first primary side series resonance circuit and the second primary side series resonance circuit including a primary side series resonance capacitor connected in series with the first inductor and the second inductor; a primary side parallel resonance circuit for performing a resonance operation in correspondence with the switching operation performed by the switching element, the primary side parallel resonance circuit including a primary side parallel resonance capacitor connected in parallel with the second inductor or the switching element; a converter transformer having a core with a primary winding on a primary side and a secondary winding on a secondary side, the primary winding being formed by the second inductor, the secondary winding having an AC voltage induced therein by the primary winding, a coupling coefficient between the primary side and the secondary side being set for loose coupling; and a secondary side DC output voltage generating section operable to perform a rectifying operation on the AC voltage induced in the secondary winding of the converter transformer and input to the secondary side DC output voltage generating section to thereby generate a secondary side DC output voltage.

In the present invention, the abnormal operation in which no ZVS operation can be obtained under an intermediate load condition is dissolved in the switching power supply circuit including the parallel resonance circuit on the primary side in the manner as described above. As a result, the practical application of the voltage resonance type converter including the secondary side series resonance circuit is readily realized.

In addition, the current caused to flow from the smoothing capacitor of the rectifying and smoothing circuit to the switching converter for generating a rectified and smoothed voltage (DC input voltage) from the commercial AC power source turns into the DC current. As a result, a small value can be selected for the capacitance of the component element as the above-mentioned smoothing capacitor, and also a product for general applications can be selected for the above-mentioned smoothing capacitor. Consequently, for example, it is possible to obtain. Affects such as low cost promotion and miniaturization of the switching capacitor.

Moreover, realizing a reduction in power loss in correspondence to the reduction in the amount of current caused to flow through the power supply circuit results in an enhancement in the overall power conversion efficiency characteristics.

DETAILED DESCRIPTION

Prior to a description of preferred embodiments of the present invention, a basic structure of a switching converter of a class-E resonance type for performing a switching operation (hereinafter referred to as "a class-E switching converter" as well) as a background of the preferred embodiments will now be described with reference to FIGS. 18 and 19.

Figure 18:
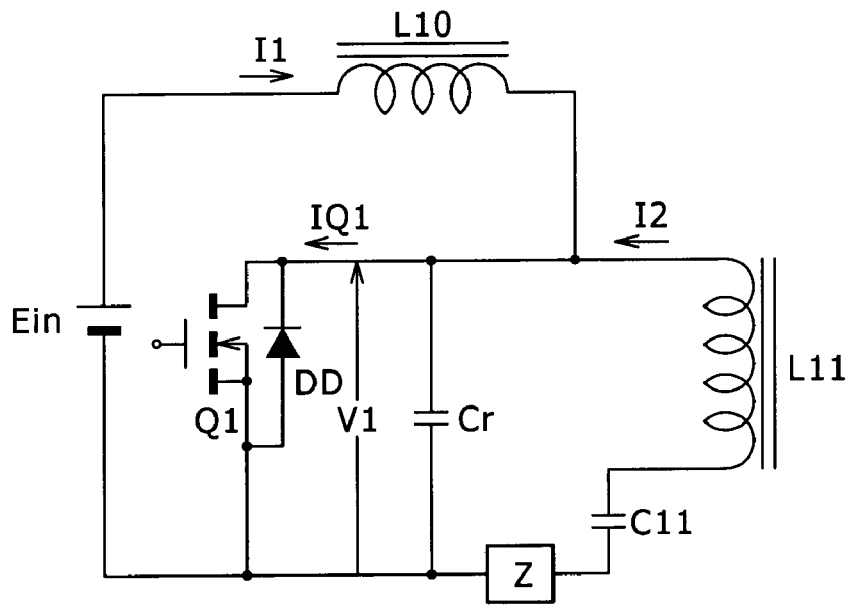
FIG. 18 is a circuit diagram showing a basic structural example of a class-E switching converter.

FIG. 18 shows a basic structure of the class-E switching converter. The class-E switching converter shown in the figure adopts a structure of a DC-AC converter which operates with a class-E resonance type.

The class-E switching converter shown in the figure includes one switching element Q1. The switching element Q1 in this case is a MOS-FET. A body diode DD is connected in parallel between a drain and a source of the switching element Q1 as the MOS-FET. A forward direction of the body diode DD in this case is directed along a direction from the source to the drain of the MOS-FET.

In addition, a primary side parallel resonance capacitor Cr is similarly connected in parallel between the drain and source of the switching element Q1.

The drain of the switching element Q1 is connected to a positive-polarity terminal of a DC input voltage source Ein through a choke coil L10 connected in series with the switching element Q1. The source of the switching element Q1 is connected to a negative polarity of the DC input voltage Ein.

In addition, one end of a choke coil L11 is connected to the drain of the switching element Q1, and a series resonance capacitor C11 is connected in series with the other end of the choke coil L11. An impedance Z as a load is inserted between the series resonance capacitor C11 and the negative-polarity terminal of the DC input voltage source Ein. A piezoelectric transformer, a fluorescent lamp coping with high frequencies, or the like can be given as a concrete example of the impedance Z in this case.

The class-E switching converter structured as described above can be regarded as one form of a compound resonance type converter including a parallel resonance circuit structured by an inductance of the choke coil L10 and a capacitance of the primary side parallel resonance capacitor Cr, and a series resonance circuit structured by an inductance of the choke coil L11 and a capacitance of the series resonance capacitor C11. In addition, the class-E switching converter structured as described above can be said to be identical to a voltage resonance type converter using a single ended system from a viewpoint of including only one switching element in terms of switching elements.

Figure 19:
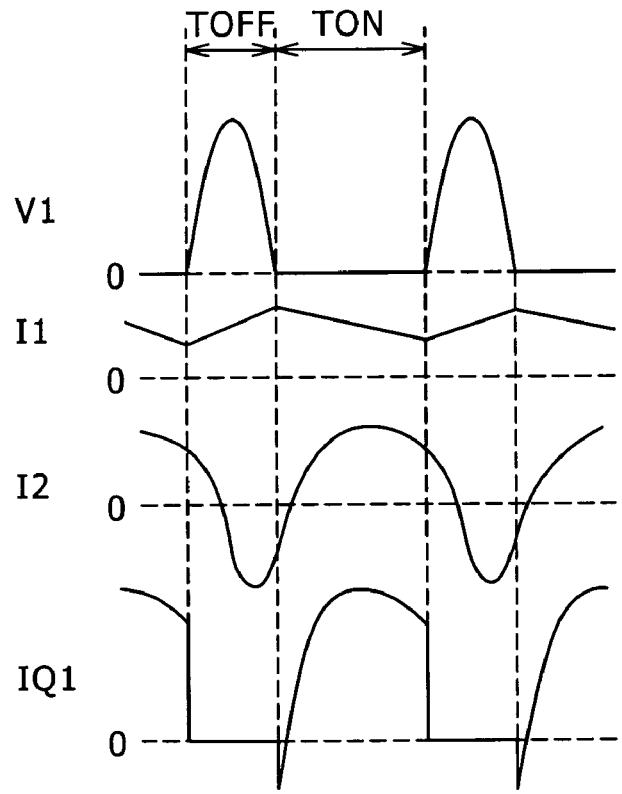
FIG. 19 is a waveform chart showing an operation of the class-E switching converter shown in FIG. 18.

FIG. 19 shows operations of the main portions of the class-E switching converter having the structure shown in FIG. 18.

A switching voltage V1 is a voltage developed across the switching element Q1. Thus, the switching voltage V1 shows a waveform in which it is held at a 0 level during an ON-time period TON for which the switching element Q1 is in an ON state, and turns into a sine wave-like pulse during an OFF-time period TOFF for which the switching element Q1 is in an OFF state. This switching pulse waveform is obtained based on the resonance operation (voltage resonance operation) of the above-mentioned parallel resonance circuit.

A switching current IQ1 is a current which is caused to flow through the switching element Q1 (and the body diode DD). During the OFF-time period TOFF, the switching current IQ1 is held at a 0 level, and during the ON-time period TON, firstly, is caused to flow through the body diode DD for a given time period from a start point to turn into the negative-polarity switching current again. After that, the negative-polarity switching current is inverted in polarity to turn into a positive-polarity switching current, and is caused to flow from the drain, to the source of the switching element Q1.

In addition, a current I2 which is caused to flow as an output from the class-E switching converter through the above-mentioned series resonance circuit is obtained by composing the switching current IQ1 caused to flow through the switching element Q1 (and the body diode DD), and a current caused to flow through the primary side parallel resonance capacitor Cr. Thus, the current I2 shows a waveform in which it contains a sine wave component.

In addition, it is also shown that the ZVS operation is obtained at turn-OFF timing of the switching element Q1 and the ZVS and zero current switching (ZCS) operations are obtained at turn-ON timing thereof based on a relationship between the switching current IQ1 and the switching voltage V1.

Also, a current I1 flowing into the class-E switching converter so as to be caused to flow, from the positive-polarity terminal of the DC input voltage Ein to the choke coil L10 shows a pulsating waveform in which the current I1 is at a predetermined mean level as shown in FIG. 19 since a relationship of L10>L11 is set for the inductances of the choke coils L10 and L11. Such a pulsating waveform can be regarded as a waveform of an approximate DC current.

Figure 20:
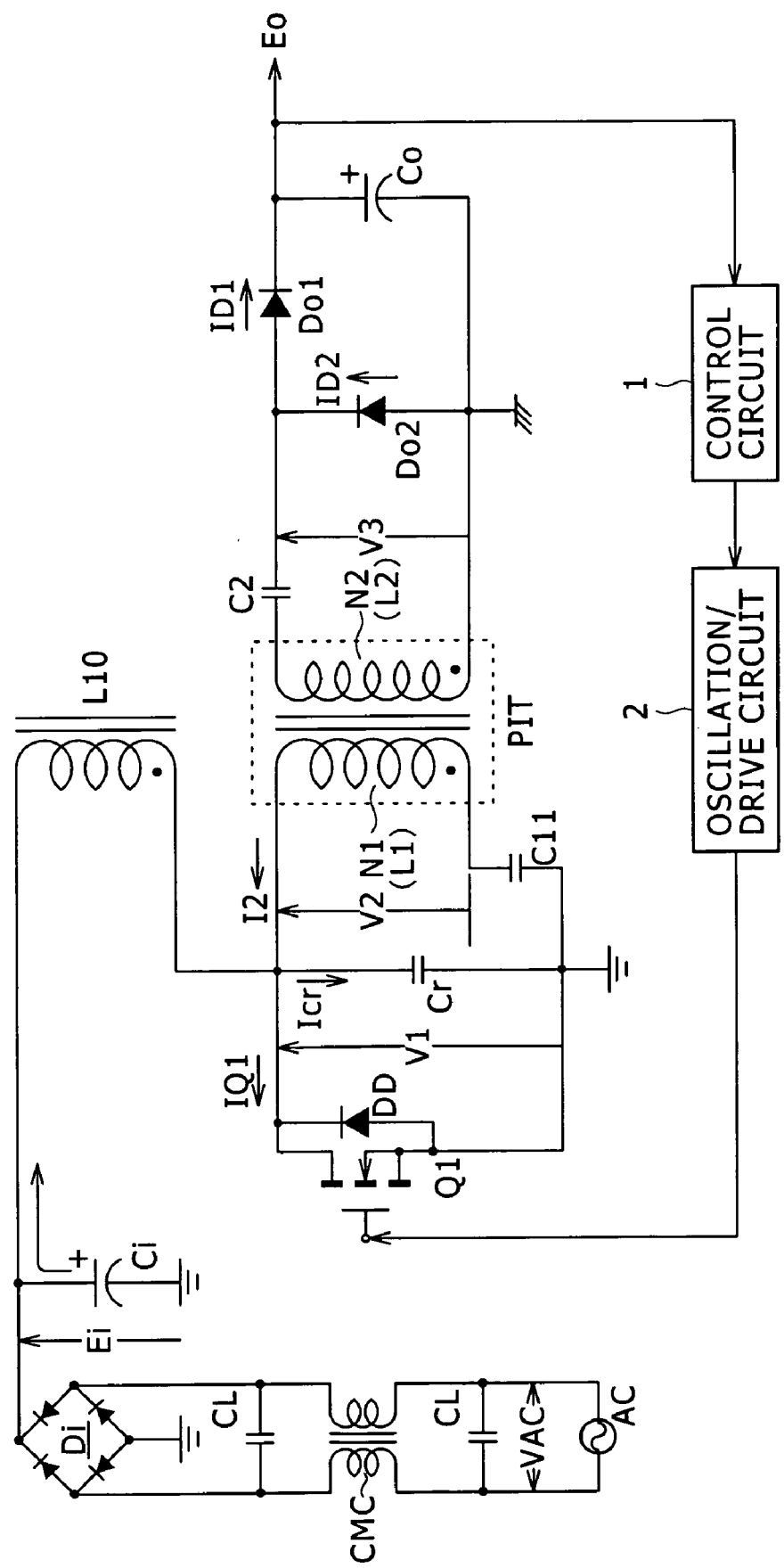
FIG. 20 is a circuit diagram showing a structural example, of a switching power supply circuit to which the class-E switching converter shown in FIG. 18 is applied.

The inventor of this application structured the power supply circuit by applying thereto the class-E switching converter based on the above-mentioned basic structure, and made the experiments on the power supply circuit thus structured. FIG. 20 shows a circuit diagram of a structural example of that power supply circuit.

In a switching power supply circuit shown in the figure, firstly, one set of common mode choke coils CMC and two across capacitors CL are inserted into a line of a conventional AC power source AC in the manner as shown in the figure. The common mode choke coils CMC and the across capacitor CL form a noise filter for removing common mode noises superimposed on an AC voltage on the line of the commercial AC power source AC.

An AC input voltage VAC from the commercial AC power source AC is rectified by a bridge rectifying circuit Di, and the resulting rectified output is charged in a smoothing capacitor Ci. That is to say, the rectifying and smoothing circuit including the bridge rectifying circuit Di and the smoothing capacitor Ci rectifies and smoothes the AC input voltage VAC from the commercial AC power source AC. As a result, a rectified and smoothed voltage Ei is obtained which is developed across the smoothing capacitor Ci. The rectified and smoothed voltage Ei becomes a DC input voltage for a switching converter in a subsequent stage.

In FIG. 20, the switching converter for receiving the rectified and smoothed voltage Ei as the DC input voltage and performing the switching operation is formed as a class-E switching converter based on the basic structure shown in FIG. 18.

A high voltage withstanding MOS-FET is selected as the switching element Q1 in this case. In addition, a driving system for the class-E switching converter in this case is a separate excitation system for switching-driving the switching element using an oscillation/drive circuit 2.

A drain of the switching element Q1 is connected to a positive polarity terminal of the smoothing capacitor Ci through a choke coil L10 connected in series with the switching element Q1. In this case, therefore, the DC output voltage Ei is supplied to the switching element Q1 through the choke coil L10 connected in series with the switching element Q1. A source of the switching element Q1 is connected to a primary side earth. An inductor (first inductor) as the choke coil L10 is a functional portion corresponding to the choke coil L10 in the class-E switching converter shown in FIG. 18.

A switching drive signal (voltage) outputted from the oscillation/drive circuit 2 is applied to a gate of the switching element Q1.

The MOS-FET is selected as the switching element Q1 in this case. Thus, as shown in FIG. 20, the body diode DD is built in the switching element Q1 so as to be connected in parallel between the source and drain of the switching element Q1. The body diode DD is formed such that its anode is connected to the source of the switching element Q1, and its cathode is connected to the drain of the switching element Q1. The body diode DD forms a path through which a reverse switching current generated based on an ON/OFF operation (switching operation) of the switching element Q1 is caused to flow.

In addition, a primary side parallel resonance capacitor Cr is connected in parallel between the drain and source of the switching element Q1.

The primary side parallel resonance capacitor Cr forms a primary side parallel resonance circuit (voltage resonance circuit) for a switching current caused to flow through the switching element Q1 by using its capacitance and a leakage inductance L1 of a primary winding N1 of an insulating converter transformer PIT. The primary side parallel resonance circuit performs a resonance operation, whereby one voltage resonance type operation is obtained as the switching operation of the switching element Q1. In correspondence this, a sine wave-like resonance pulse waveform is obtained as a waveform of a voltage (drain to source voltage) V1 developed across the switching element Q1 during the OFF-time period of the switching element Q1.

In addition, a series connection circuit including the primary winding N1 of the insulating converter transformer PIT which will be described later and a primary side series resonance capacitor C11 is connected between the source and drain of the switching element Q1. In this case, a winding finish end portion of the primary winding N1 is connected to the drain of the switching element Q1, and a winding start end portion thereof is connected to the primary side series resonance capacitor C11. A polarity terminal of the primary side series resonance capacitor C11 which is not connected to the primary winding N1 is connected to the source of the switching element Q1 at the earth potential.

The oscillation/drive circuit 2 includes an oscillation circuit in order to drive the switching element Q1 by using the separate excitation system for example. Also, the oscillation/drive circuit 2 generates a drive signal as a gate voltage used to switching-drive the MOS-FET based on an oscillation signal obtained from the oscillation circuit, and applies the drive signal thus generated to the gate of the switching element Q1. As a result, the switching element Q1 continuously performs an ON/OFF operation in correspondence to a drive signal waveform, i.e., performs the switching operation.

The insulating converter transformer PIT serves to transmit a switching output from a primary side switching converter to the secondary side with the primary side and the secondary side being insulated from each other in terms of a DC form. For this reason, the primary winding N1 and a secondary winding N2 are wound in the insulating converter transformer PIT.

The insulating converter transformer PIT in this case, as one example, includes an EE letter-like core in which two E letter-like cores mode of a ferrite terminal are combined with each other in terms of a structure. Then, after the winding portion is divided between the primary side and the secondary side, the primary winding N1 and the secondary winding N2 are wound around a central magnetic leg of the EE letter-like core.

In addition, a gap having a gap length of about 1.6 mm is formed in the central magnetic leg of the EE letter-like core of the insulating converter transformer PIT. As a result, a coupling coefficient k of about 0.75 is obtained between the primary side and the secondary side. A saturated state becomes hard to be obtained all the more because the coupling having the coupling coefficient k of this degree is regarded as loose coupling in terms of the degree of coupling.

The primary winding N1 of, the insulating converter transformer PIT is an element for, forming a primary side series resonance circuit in the class-E switching converter formed on the primary side in the manner as will be described later. Thus, an AC output corresponding to the switching output from the switching element Q1 is obtained.

On the secondary side of the insulating converter transformer PIT, an AC voltage induced by the primary winding N1 is generated in the secondary winding N2.

A secondary side series resonance capacitor C2 is connected in series with the secondary winding N2. As a result, a leakage inductance L2 of the secondary winding N2, and a capacitance of the secondary side series resonance capacitor C2 form a secondary side series resonance circuit. The secondary side series resonance circuit performs a resonance operation in correspondence to a rectifying operation of a secondary side rectifying circuit which will be described later. As a result, a secondary winding current caused to flow through the secondary winding N2 shows a sine wave waveform. That is to say, a current resonance operation is obtained on the secondary side.

Two rectifying diodes Do1 and Do2, and one smoothing capacitor Co are connected to the secondary winding N2 with which the secondary side series resonance capacitor C2 is connected in series in the manner as described above. As a result, the secondary side rectifying circuit in this case is structured as a voltage doubler half-wave rectifying circuit. As for a connection form of the voltage doubler half-wave rectifying circuit, firstly, an anode of the rectifying diode Do1, and a cathode of the rectifying diode Do2 are connected to a winding finish end portion side of the secondary winding N2 through the secondary side series resonance capacitor C2. Also, a cathode of the rectifying diode Do1 is connected to a positive-polarity terminal of the smoothing capacitor Co. A winding start end portion of the secondary winding, N2 and an anode of the rectifying diode Do2 are connected to a negative-polarity terminal of the smoothing capacitor Co at a secondary side earth potential.

A rectifying operation of the voltage doubler half-wave rectifying circuit thus formed is as follows.

Firstly, during a half period corresponding to one polarity of a voltage (secondary winding voltage) developed across the secondary winding N2 as an AC voltage induced in the secondary winding N2, a forward voltage is applied to the rectifying diode Do2. As a result, the rectifying diode Do2 conducts and thus there is obtained an operation for charging the secondary side series resonance capacitor C2 with the rectified current. As a result, an across voltage at a level corresponding to an equimultiple of a level of the AC voltage induced in the secondary winding N2 is generated in the secondary side series resonance capacitor C2. During a next half period corresponding to the other polarity of the secondary winding voltage V3, a forward voltage is applied to the rectifying diode Do1 to cause the rectifying diode Do1 to conduct. At this time, the smoothing capacitor Co is charged with electricity at a potential, which is obtained by superimposing the voltage developed across the secondary side series resonance capacitor C2 on the potential of the secondary winding voltage V3.

As a result, a secondary side DC output voltage Eo at a level which is double that of the AC voltage induced in the secondary winding N2 is obtained as the voltage across the smoothing capacitor Co.

In this rectifying operation, the smoothing capacitor Co is charged with electricity during only one half period of the AC voltage induced in the secondary winding N2. That is to say, the voltage doubler half-wave rectifying operation is obtained. In addition, in such a rectifying operation, the rectifying operation can be regarded as being performed for a resonance output of a secondary side series resonance circuit formed by a series combination of the secondary winding N2 and the secondary side series resonance capacitor C2.

The secondary side DC output voltage Eo thus generated is supplied to the load. Also, the secondary side DC output voltage Eo bifurcates to be outputted as a detection voltage to the control circuit 1.

The output circuit 1 supplies a detection output corresponding to a change in level of the secondary side DC output voltage Eo inputted thereto to the oscillation/drive circuit 2. The oscillation/drive circuit 2 makes a switching frequency variable in correspondence to the inputted detection output of the control circuit 1. Also, along with this operation, the oscillation/drive circuit 2 drives the switching element Q1 so as to make a time period ratio (conduction angle) of the ON-time period TON to the OFF-time period TOFF for one switching period variable. This operation becomes a constant voltage controlling operation for the secondary side DC output voltage.

The switching frequency and conduction angle of the switching element Q1 is variably controlled in the manner as described above. As a result, the resonance impedances on the primary side and secondary side, and the power transmission effective time period in the power supply circuit change. This results in that an amount of power transmitted from the primary winding N1 to the secondary winding N2 side of the insulating converter transformer PIT changes, and an amount of power to be supplied from the secondary side rectifying circuit to the load changes. As a result, there is obtained the operation for controlling the level of the secondary side DC output voltage Eo so as to cancel the level fluctuation in the secondary side DC output voltage Eo. That is to say, the secondary side DC output voltage Eo is stabilized.

Let us compare the circuit structure of the switching converter (Q1, Cr, L10, N1, C11) formed on the primary side of the power supply circuit of FIG. 20 structured as described above with that of the class-E converter which is formerly shown in FIG. 18. Thus, the switching converter shown in FIG. 20 can be regarded as one in which the impedance Z as the load is omitted from the circuit shown in FIG. 18, and the winding of the choke coil L11 is replaced with the primary winding N1 (the leakage inductance L1) of the insulating converter transformer PIT. In addition, in the primary side switching converter shown in FIG. 20, the inductance of the choke coil L10 and the capacitance of the primary side parallel resonance capacitor Cr form the primary side parallel resonance circuit. Also, the leakage inductance L1 of the primary winding N1 of the insulating converter transformer PIT and the capacitance of the primary side series resonance capacitor C11 form the primary side series resonance circuit.

From this, the primary side switching converter shown in FIG. 20 can be said to be constructed as the class-E switching converter for performing the class-E resonance type switching operation. The switching output (AC output) obtained from the switching operation of the primary side switching converter is transmitted from the primary winding N1 corresponding to the choke coil L11 to the secondary winding N2 through the magnetic coupling in the insulating converter transformer PIT. The switching output is then rectified on the secondary side to obtain the DC output voltage Eo. That is to say, the power supply circuit shown in FIG. 20 is structured in the form of a DC-DC converter including the class-E switching converter on the primary side.

In addition, the primary side class-E switching converter thus structured can also be regarded as being structured as the compound resonance type converter or the soft switching power source. In this case, in the compound resonance type converter or the soft switching power source, the series connection circuit of the primary winding N1 and the primary side series resonance capacitor C11 forming the primary side series resonance circuit is connected in parallel with the switching element Q1 (and the body diode,DD) which forms, together with the choke coil L10 and the primary side parallel resonance capacitor Cr, the voltage resonance type converter.

Now, in general, it is thought that the power supply circuit including the voltage resonance type converter on the primary side cannot be put to practical use when its circuit structure is held as it is because its control range of the load power is narrow and the ZVS during the light load phase cannot be maintained. Thus, the inventor of this application made the experiments on the power supply circuit which was structured such that the secondary side series resonance circuit was provided in the primary side voltage resonance type converter, and the voltage doubler half-wave rectifying circuit was formed as the secondary side rectifying circuit in the manner as formerly shown in FIG. 21 as the conventional example. As a result, it was confirmed that the characteristics were obtained which approached to more practical application than that for the power supply circuit including the voltage resonance type converter until that time.

However, in the power supply circuit shown in FIG. 21, as described with reference to FIGS. 22A, 22B and 22C, the abnormal operation is caused in which during the intermediate load phase, the current is caused to flow through the switching element Q1 in the positive-polarity direction (in the direction from the drain to the source in this case) before completion of the OFF-time period (TOFF) of the switching element Q1, and thus no ZVS operation is obtained. For this reason, it was still difficult to put even the structure of the power supply circuit shown in FIG. 21 to practical application.

As described above, the power supply circuit described with reference to FIG. 20 is said to adopt the structure common to the conventional power supply circuit shown in FIG. 21 in that it is the compound resonance type switching converter having the circuit structure of the voltage resonance type converter on the primary side.

However, as a result of making the experiments on the power supply circuit shown in FIG. 20, it was verified that the abnormal operation was dissolved in which no ZVS was obtained during the intermediate load phase, and the normal switching operation was obtained over the overall range of the predetermined corresponding load power.

Figure 21:
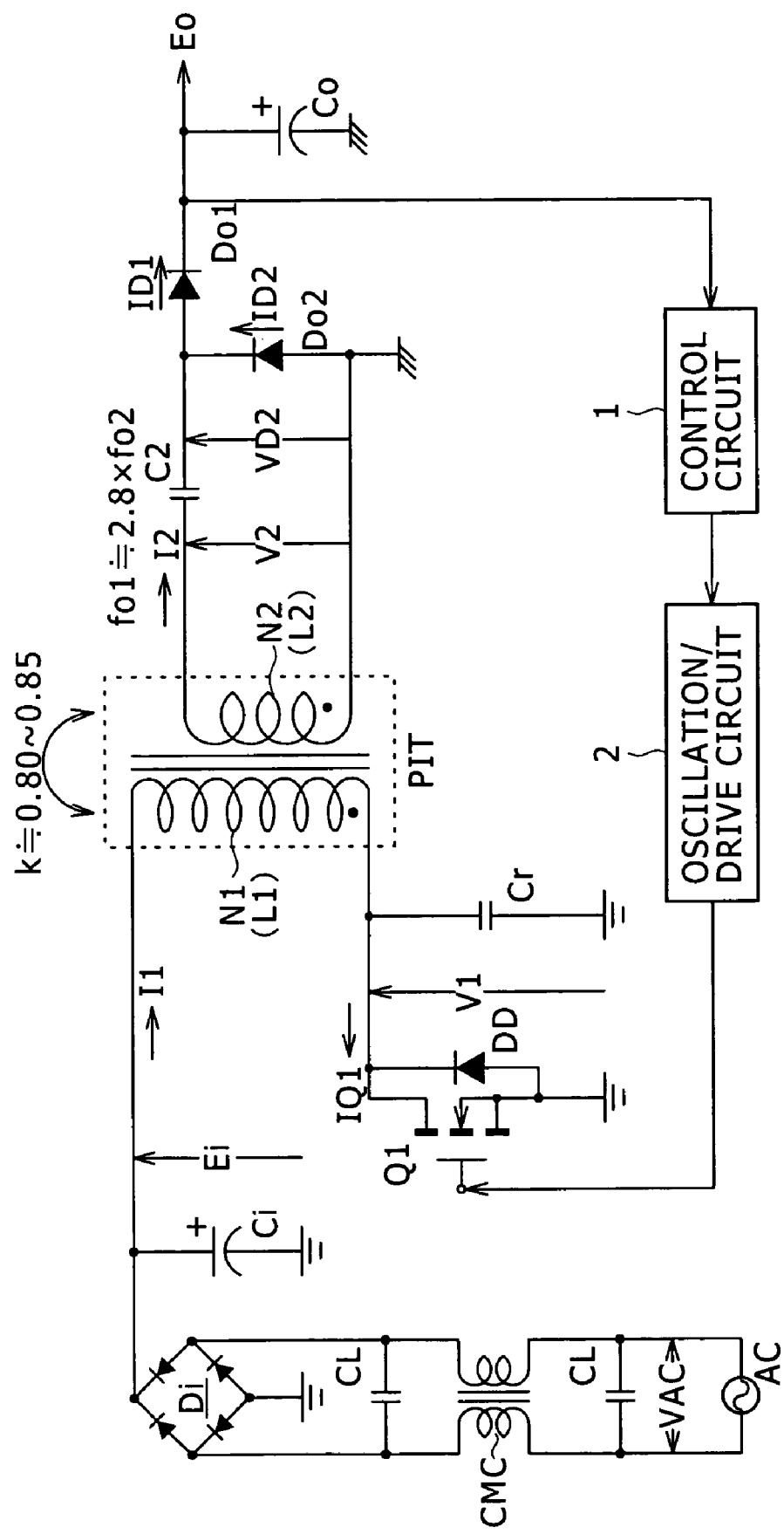
FIG. 21 is a circuit diagram showing a structural example of a conventional power supply circuit.
Figure 22C:
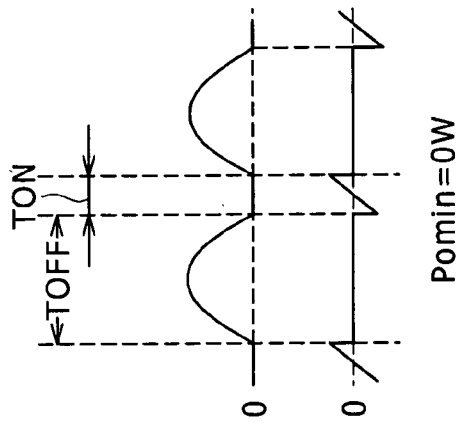
FIGS. 22A, 22B and 22C are respectively waveform charts showing operations of main portions of the conventional power supply circuit shown in FIG. 21.
Figure 22B:
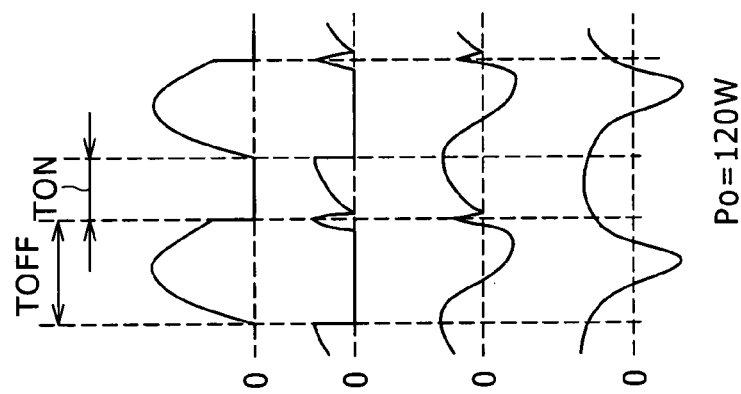

It has been confirmed that the abnormal operation during the intermediate load phase of the power supply circuit shown in FIG. 21 is easy to cause when structuring the compound resonance type converter including the secondary side series resonance circuit in the voltage resonance type converter. That is to say, the abnormal operation during the intermediate load phase is mainly caused by the interaction resulting from that the primary side parallel resonance circuit forming the voltage resonance type converter, and the secondary side series resonance circuit (rectifying circuit) simultaneously operate. In other words, it can be grasped that the first main cause on the above-mentioned abnormal operation during the intermediate load phase results from the circuit structure in which the primary side voltage resonance type converter and the secondary side series resonance circuit are combined with each other. Based on this grasp, firstly, the power supply circuit shown in FIG. 20 is structured such that with regard to the primary side switching converter, the class-E switching converter is applied instead of the voltage resonance type converter.

In the power supply circuit shown in FIG. 20, the abnormal operation in which no ZVS is obtained during the intermediate load phase is dissolved irrespective of whether or not the series resonance circuit is provided on the secondary side with the adoption of such a structure as a primary factor.

As described above, in the power supply circuit shown in FIG. 20, the abnormal operation during the intermediate load phase is dissolved which is a problem in the power supply circuit shown as the conventional example in FIG. 21.

However, in the power supply circuit shown in FIG. 20, the choke coil L10 which is not provided in the power supply circuit shown in FIG. 21 is inserted into the line through which the DC input voltage is applied to the switching converter. A relatively large component is selected for the core used to construct the choke coil L10 for example from the necessity for setting an inductance of e.g., about 1 mH in the choke coil L10. This selection becomes a main cause of impeding the promotion of cost down, miniaturization of the circuit, and the like.

Then, in this embodiment mode, the inventor of this application further pushes ahead with the power supply circuit shown in FIG. 20, and dissolves the abnormal operation during the intermediate load phase by applying the class-E switching converter as the power supply circuit to the power supply circuit. After that, inventor of this application proposes the circuit structure for compensating for the reduction of the power conversion efficiency described above to enhance the power conversion efficiency, and miniaturizing the component corresponding to the choke coil L10.

Figure 1:
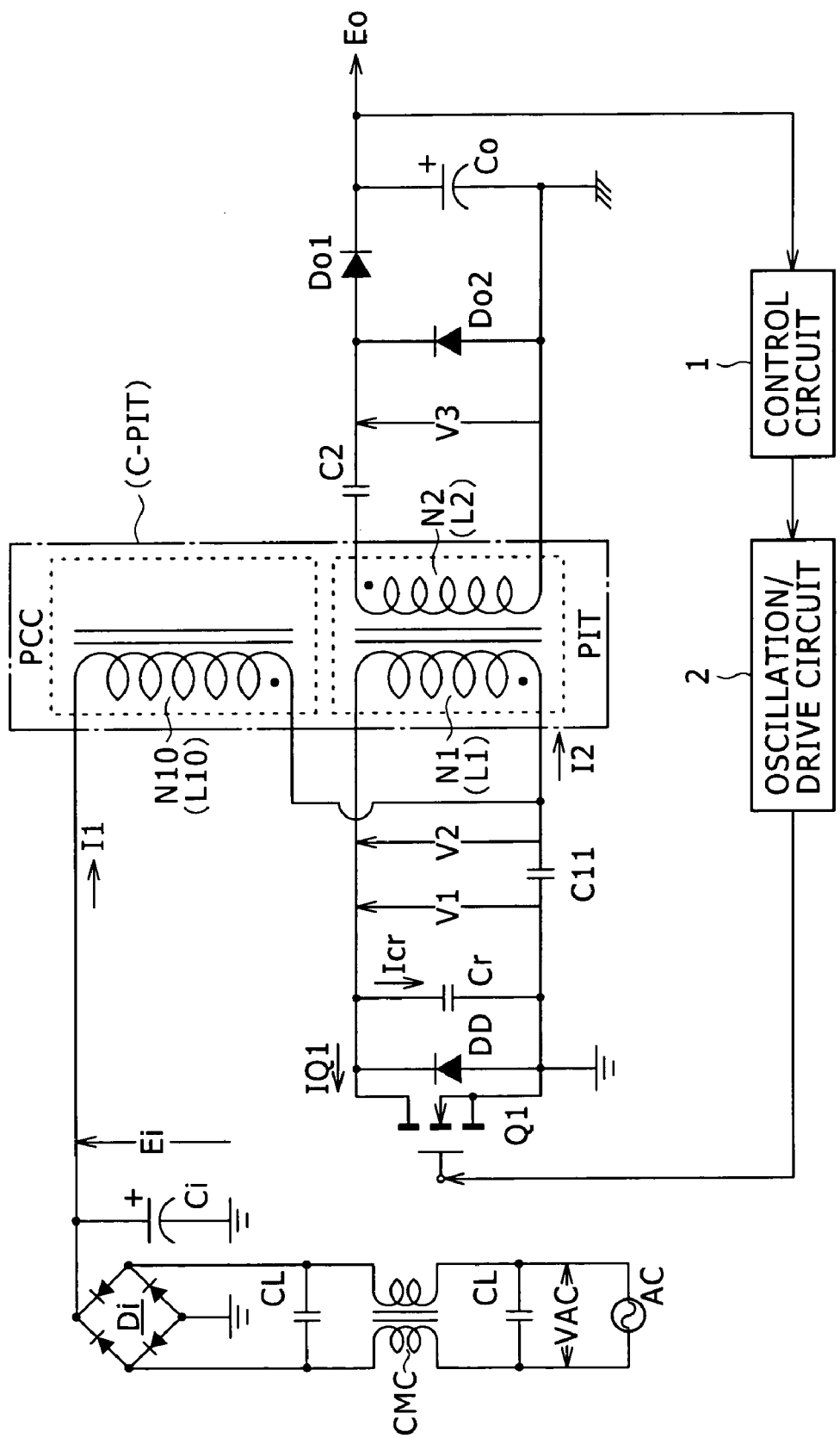
FIG. 1 is a circuit diagram showing a structural example of a power supply circuit according to a first embodiment of the present invention.

FIG. 1 shows a structural example of a power supply circuit according to a first embodiment of the present invention as the power supply circuit of the embodiment mode. At that, in FIG. 1, the same constituent elements as those of FIG. 20 are designated with the same reference numerals, respectively, and a description thereof is omitted here.

Firstly, in the power supply circuit shown in FIG. 1, a winding finish end portion of a choke coil winding N10 is connected to a positive-polarity terminal of the smoothing capacitor Ci. Also, a winding start end portion of the choke coil winding N10 is connected to a winding start end portion of the primary winding N1. In addition, a one-polarity end portion of the primary side series resonance capacitor C11 in this case is connected to a node between the winding start end portion of the primary winding N1 and the choke coil winding N10. Also, the other-polarity end portion of the primary side series resonance capacitor C11 is connected to a node between one-polarity terminal of the primary side parallel resonance capacitor Cr at the primary side earth potential and the drain of the switching element Q1. As a result, there is obtained a relationship of a series combination of the primary side series resonance capacitor C11 and the primary winding N1.

At that, in this case as well, the primary side parallel resonance capacitor Cr is connected in parallel between the source and drain of the switching element Q1.

In this embodiment, the choke coil winding N10 inserted in the manner as described above corresponds to the winding as the choke coil L10 shown in FIG. 18 or FIG. 20. In this embodiment, the choke coil winding N10 is wound around a core having predetermined shape and size, thereby constructing a component element as a choke coil PCC. Alternatively, the choke coil N10 can also be wound so as to be included in the construction of the insulating converter transformer. In this case, the insulating converter transformer PIT is constructed as a compound insulating converter transformer C-PIT.

In the circuit structure as described above, the primary side parallel resonance circuit (first primary side parallel resonance circuit) can be regarded as being structured by a composite inductance and the capacitance of the primary side parallel resonance capacitor Cr based on the series connection circuit of the choke coil winding N10 and the primary winding N1, and the primary side parallel resonance capacitor Cr connected in parallel with that series connection circuit. In this case, the composite inductance is obtained by composing the inductance L10 of the choke coil winding N10 (the choke coil PCC) and the leakage inductance L1 of the primary winding N1 with each other.

In addition, the primary side series resonance circuit includes a first primary side series resonance circuit structured by the capacitance of the primary side series resonance capacitor C11 and the leakage inductance L1 of the primary winding N1 based on a series combination of the primary side series resonance capacitor C11 and the primary winding N1. Also, the primary side series resonance circuit includes a second primary side series resonance circuit structured by the inductance L10 of the choke coil winding N10 and the capacitance of the primary side series resonance capacitor C11 based on a series combination of the choke coil winding N10 and the primary side series resonance capacitor C11.

In correspondence to the switching operation made by the switching element Q1, a charging/discharging current is caused to flow through the primary side parallel resonance capacitor Cr during an OFF-time period of the switching element Q1 based on the voltage resonance operation of the above-mentioned primary side parallel resonance circuit. A nearly half sine wave-like resonance pulse voltage is generated as a voltage across the primary side, parallel resonance capacitor Cr by the charging/discharging current. In the circuit shown in FIG. 1, the primary winding N1 is inserted in the primary side parallel resonance circuit. Hence, an operation for superimposing the resonance pulse voltage on an AC voltage generated in correspondence to the switching current is generated in the primary winding N1.

In addition, the first primary side series resonance circuit performs a resonance operation so that a resonance current is caused to flow through a path having the primary side series resonance capacitor C11, the primary winding N1 and the switching element Q1 during the ON-time period of the switching element Q1.

Also, the second primary side series resonance circuit performs a resonance operation so that the resonance current is caused to flow through the path having the primary side series resonance capacitor C11, the choke coil winding N10, and the smoothing capacitor Ci in correspondence to the switching operation of the switching element Q1.

The first primary side series resonance circuit and the second primary side series resonance circuit compoundly operate in the manner as described above, whereby for example, a series resonance current to be caused to flow through the primary winding N1 is caused to separately flow through the choke coil winding N10 as well.

Let us consider the case where the current path having the primary side series resonance capacitor C11, the primary winding N1 and the switching element Q1 and corresponding to the first primary side series resonance circuit, and the current path having the primary side series resonance capacitor C11, the choke coil N10, and the smoothing capacitor Ci and corresponding to the second primary side series resonance circuit are seen in terms of an AC form on the switching period. In this case, both the current paths can be regarded as showing a parallel relationship with the primary side series resonance capacitor C11 as a common constituent element.

At that, the secondary side circuit structure shown in FIG. 1, similarly to that shown in FIG. 20, has the voltage doubler half-wave rectifying circuit including the secondary side series resonance circuit. Referring to FIG. 1, however, the winding start end portion side of the secondary winding N2 is connected to the secondary side series resonance capacitor C2, and the winding finish end portion thereof is connected to the negative-polarity terminal of the smoothing capacitor Co at the secondary side earth potential.

Figure 11:
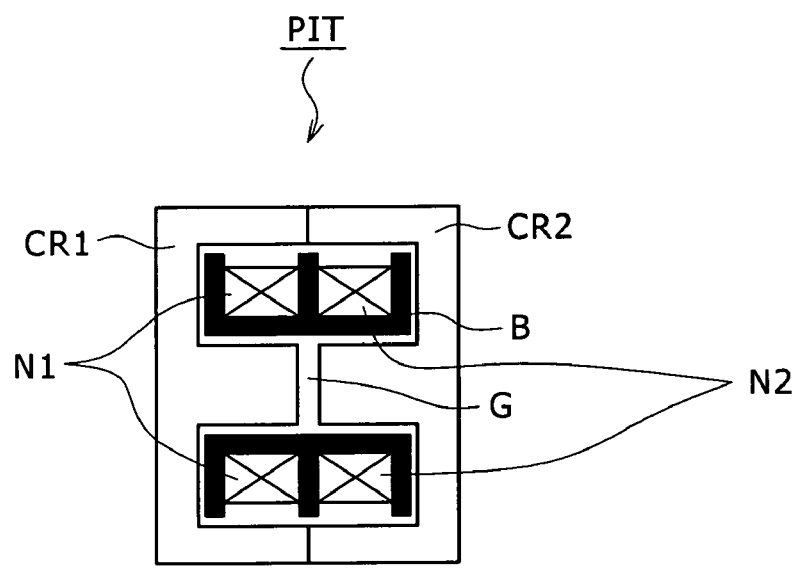
FIG. 11 is a view showing, a constructional example of an insulating converter transformer provided in each of the power supply circuits according to the first and second embodiments of the present invention.

Firstly, FIG. 11 shows a constructional example of the insulating converter transformer PIT, which includes no choke coil winding N10 and which is a component separately from the choke coil PCC, in terms of a construction of the insulating converter transformer included in the power supply circuit having the structure shown in FIG. 1.

As shown in the figure, the insulating converter transformer PIT includes an EE type core (EE letter-like core) in which two E letter-like cores CR1 and CR2 made of a ferrite material are combined with each other so that their magnetic legs face each other.

The insulating converter transformer PIT is provided with a bobbin B made of e.g., a resin, having a shape which is partitioned between the primary and secondary side winding portions so that they are provided independent of each other. The primary winding N1 is wound around one core winding portion of the bobbin B. Also, the secondary winding N2 is wound around the other winding portion of the bobbin B.

The bobbin B around which the primary side winding and the secondary side winding are wound, respectively, in such a manner is mounted to the EE letter-like core (CR1, CR2). As a result, a state is provided in which the primary side winding and the secondary side winding are wound in different winding regions around the central magnetic leg of the EE letter-like core, respectively. The construction of the overall insulating converter transformer PIT is obtained in such a manner.

In addition, a gap G having a gap length of e.g., about 1.6 mm or more is formed in the central magnetic leg of the EE letter-like core in the manner as shown in the figure. As a result, a loose coupling state having a coupling coefficient k of e.g., about 0.75 is obtained. That is to say, the coupling state of this insulating converter transformer PIT is looser than that of the insulating converter transformer PIT which is shown as the conventional example in FIG. 21. It should be noted that the gap G can be formed by making each of the central magnetic legs of the E letter-like cores CR1 and CR2 shorter than corresponding two outer magnetic legs.

In addition, when this construction of the insulating converter transformer PIT including no choke coil winding N10 is adopted in such a manner, the choke coil PCC including the choke coil winding N10 is constructed as a component which is made separately and independent of the insulating converter transformer PIT. The choke coil PCC in this case adopts a construction in which for example, the choke coil winding N10 is wound around an ER type core or the like so as to obtain a necessary inductance value.

Figure 12:
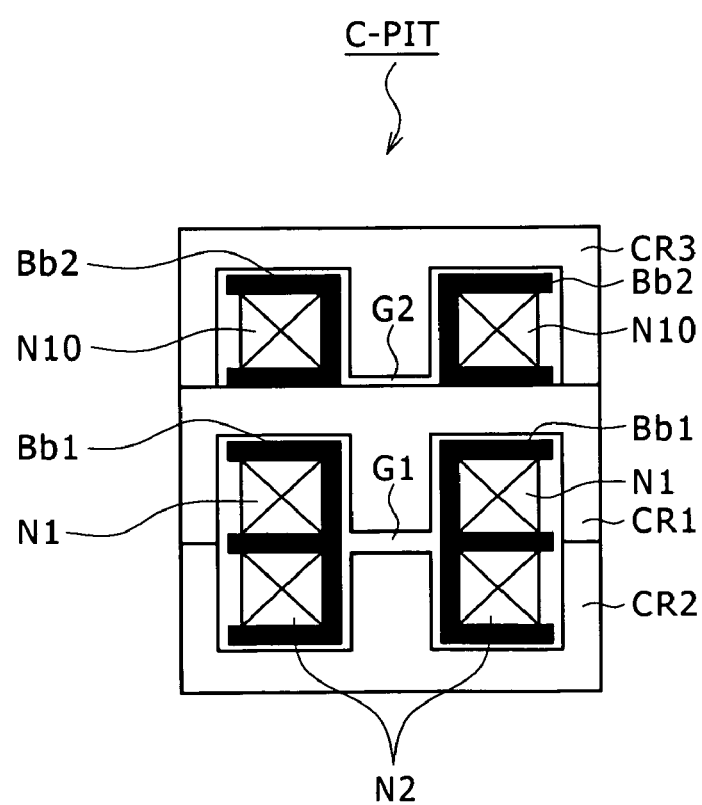
FIG. 12 is a view showing a constructional example of a compound insulating converter transformer provided in each of the power supply circuits according to the first and second embodiments of the present invention.

In addition, FIG. 12 shows a constructional example in the case where the insulating converter transformer PIT included in the power supply circuit having the structure shown in FIG. 1 is constructed in the form of the compound insulating converter transformer C-PIT including therein the choke coil winding N10 (the choke coil PCC).

Firstly, the compound insulating converter transformer C-PIT shown in FIG. 12 includes an EE letter-like core in which two E letter-like cores CR1 and CR2 made of e.g., a ferrite material are combined with each other so that their magnetic legs face each other.

In addition, the compound insulating converter transformer C-PIT also includes a bobbin Bb1, made of e.g., a resin, having a shape which is partitioned between the primary and secondary side winding portions so that they are, provided independent of each other. The primary winding N1 is wound around one winding portion of the bobbin Bb1. In addition, the secondary winding N2 is wound around the other winding portion.

The bobbin Bb1 around which the primary side winding and the secondary side winding are wound in such a manner is mounted so that the central magnetic leg of the EE letter-like core having the E letter-like cores CR1 and CR2 completely extend through the bobbin Bb1. As a result, a state is provided in which the primary side winding and the secondary side winding are wound in different winding regions around the central magnetic leg of the EE letter-like core portion, respectively.

In addition, the EE letter-like core (CR1, CR2) is further combined with an E letter-like core CR3 in the manner as shown in the figure. In this case, the combination is made so that end faces of leg portions of the E letter-like core CR3 face a side face of the E letter-like core CR1 in the EE letter-like core (CR1, CR2).

A bobbin Bb2 having one winding region is mounted to the E letter-like core CR3, and the choke coil winding N10 is, wound in the one winding region. As a result, a state is provided in which the choke coil winding N10 is wound around the central magnetic leg of the E letter-like core CR3.

In addition, a gap G1 having a predetermined length is formed in the central magnetic leg of the EE letter like core (CR1, CR2) in the manner as shown in the figure. As a result, a coupling coefficient k between the primary side and the secondary side in the compound insulating converter transformer C-PIT itself has a value of about 0.75. Thus, there is obtained a state of loose coupling in which the coupling coefficient k is equal to or smaller than 0.8. That is to say, the coupling state of this compound insulating converter transformer C-PIT is looser than that of the compound insulating converter transformer C-PIT of the power supply circuit which is shown as the conventional example in FIG. 21. It should be noted that the gap G can be formed by making each of the central magnetic legs of the E letter-like cores CR1 and CR2 shorter than corresponding two center magnetic legs.

In addition, for example, the central magnetic leg of the E letter-like core CR3 is made shorter than each of the outer magnetic legs thereof, thereby forming a gap G2 between an end portion of the central magnetic leg of the E letter-like core CR3 and a side face portion of the EE letter-like core CR1. A gap length of the gap G2 in this case is set to about half that of the above-mentioned gap G1.

As described above, the insulating converter transformer shown in FIG. 12 adopts the construction as the compound transformer. That is to say, this construction is such that the primary winding N1 and the secondary winding N2 are wound as a basic construction in a state of being insulated from each other in terms of a DC form, and moreover, the choke coil winding N10 included in the primary side is also wound. With the construction as shown in FIG. 12, firstly, currents are caused to flow through the primary winding N1 and the secondary winding N2, respectively, thereby forming a main magnetic path (magnetic circuit) in the EE letter-like core including the E letter-like cores CR1 and CR2. However, a current is caused to flow through the choke coil winding N10, thereby forming a main magnetic path only in the E letter-like core CR3 side. The magnetic paths are formed in such a manner, whereby the extent to which a magnetic flux of the magnetic path formed by the primary winding N1 and the secondary winding N2 is interlinked with a magnetic flux of the magnetic path formed by the choke coil winding N10 becomes very small. As a result, the choke coil winding N10, for example, has a predetermined inductance corresponding to the number of windings, the gap length of the gap G2, and the like. Also, the degree (coupling coefficient) of the magnetic coupling between the choke coil winding N10 and each of the primary winding N1 and the secondary winding N2 is reduced to a value equal to or smaller than such a predetermined value as to be regarded as zero. That is to say, a state is caused in which the transformer coupling can be regarded as being absent between the choke coil winding N10 and each of the primary winding N1 and the secondary winding N2. As a result, the converter transformer function of coupling the primary winding N1 and the secondary winding N2 with each other, and the function of the choke coil winding N10 as the choke coil operate independent of each other without a mutual influence. Therefore, though the primary winding N1, the secondary winding N2 and the choke coil winding N10 are included in one transformer construction, the proper operation of the class-E switching converter is obtained on the primary side.

At that, in the present invention, as described formerly, too, the insulating converter transformer PIT having the construction in which the primary winding N1 and the secondary winding N2 are wound, and the choke coil PCC in which the choke coil winding N10 is wound may be constructed as separate components, respectively. In this case, for example, the insulating converter transformer PIT is made to have such a construction that the primary winding N1 and the secondary winding N2 are wound around an EE letter-like core having predetermined shape and size, and also the choke coil PCC is made to have such a construction that the winding is wound around an EE letter-like core having predetermined shape and size. As a result, the separate constructions are obtained. With such a construction, however, two independent components are required for the insulating converter transformer PIT and the choke coil PCC. On the other hand, when the construction of the insulating converter transformer PIT of this embodiment is adopted, these two components can be arranged into one component. As a result, for example, disposition of the components on the circuit board becomes more efficient than before. Thus, for example, the circuit board becomes easy to miniaturize.

As described above, under the present invention, the construction as the compound transformer in which the insulating converter transformer includes the winding of the choke coil PCC may be adopted, or the construction in which the primary winding N1 and the secondary winding N2 are wound independent of the choke coil PCC may be adopted. In consideration of such a situation, when there is no need of especially distinguishing clearly between both the constructions in the following description, the transformer will be described as the insulating converter transformer PIT in some cases.

Figure 13:
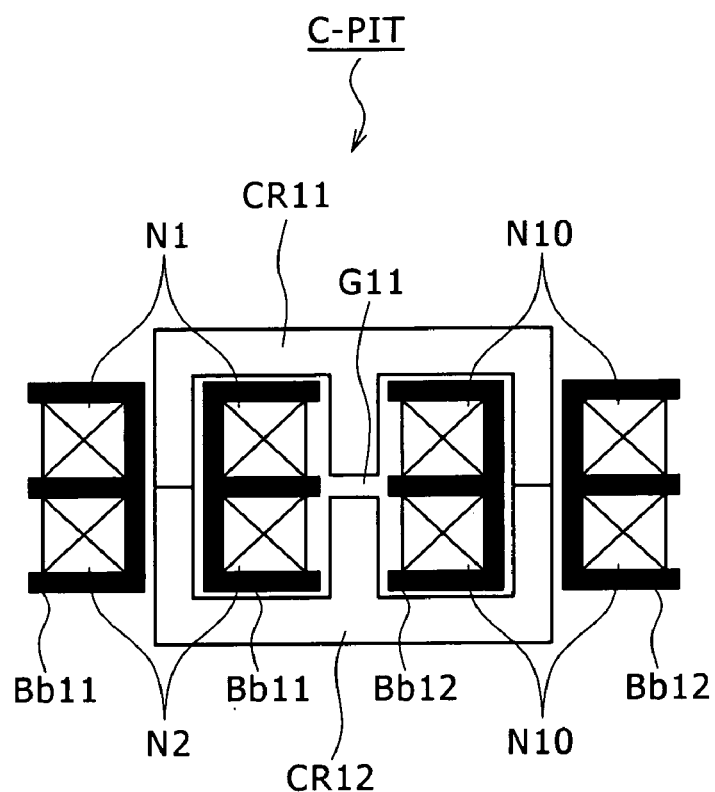
FIG. 13 is a view showing another constructional example of the compound insulating converter transformer provided in each of the power supply circuits according to the first and second embodiments of the present invention.
Figure 14:
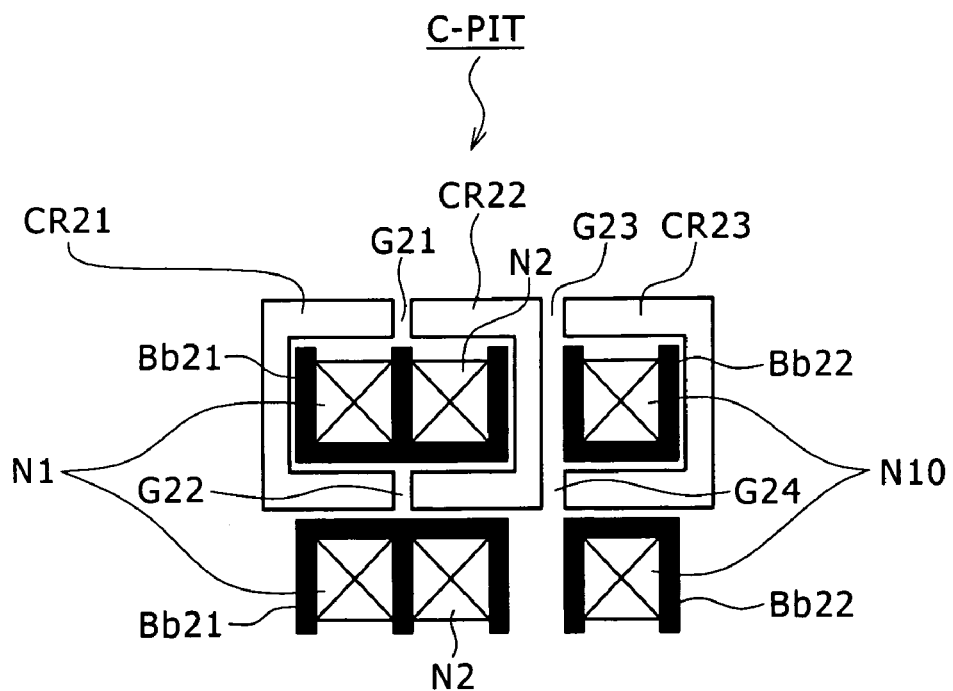
FIG. 14 is a view showing still another constructional example of the compound insulating converter transformer provided in each of the power supply circuits according to the first and second embodiments of the present invention.

FIGS. 13 and 14 show other constructional examples of the compound insulating converter transformer C-PIT.

The compound insulating converter transformer C-PIT shown in FIG. 13 includes an EE letter-like core in which two E letter-like cores CR11 and CR12 are combined with each other so that their magnetic legs face each other. At that, each of two outer magnetic legs, and one central magnetic leg in the EE letter-like core are made identical in cross sectional size to each other.

In addition, the primary winding N1 and the secondary winding N2 are wound around two partition winding portions formed in a bobbin Bb11, respectively. Also, the bobbin Bb11 is mounted to one outer magnetic leg of the EE letter-like core. As a result, the primary winding N1 and the secondary winding N2 are wound in different winding regions around the same outer magnetic leg. After the primary winding N1 and the secondary winding N2 are wound in such a manner, a gap G11 having a predetermined gap length is formed in the central magnetic leg of the EE letter-like core. As a result, a predetermined coupling coefficient k is obtained between the primary winding N1 and the secondary winding N2, which results in that the degree of coupling regarded as loose coupling due to the predetermined coupling coefficient k is obtained.

In addition, the choke coil winding N10 is wound around a winding portion of a bobbin Bb12, and the bobbin Bb12 is then mounted to one outer magnetic leg of the EE letter-like core. As a result, the choke coil winding N10 is wound around the outer magnetic leg opposite to the outer magnetic leg around which the primary winding N1 and the secondary winding N2 are wound. In this case, these two outer magnetic legs are symmetrical with respect to the central magnetic leg.

With such a construction, a main magnetic path due to the primary winding N1 and the secondary winding N2 is formed so as to link the outer magnetic leg around which the primary winding N1 and the secondary winding N2 are wound, and the central magnetic leg with each, other. A main magnetic path due to the choke coil winding N10 is formed so as to link the outer magnetic leg around which the choke coil winding N10 is wound, and the central magnetic leg with each other. Thus, in this case as well, the extent to which the magnetic fluxes of both the magnetic paths are interlinked with each other becomes very small. As a result, the degree of coupling (coupling coefficient) between the choke coil winding N10, and each of the primary winding N1 and the secondary winding N2 may be regarded as being about zero. Thus, a state in which the transfer coupling is absent can be obtained similarly to the case shown in FIG. 12.

In addition, in the case of a compound insulating converter transformer C-PIT shown in FIG. 14, for example, firstly, a UU letter-like core is formed in which two U letter-like cores CR21 and CR22 made of a ferrite material are combined with each other so that their magnetic legs face each other. Moreover, the resulting UU letter-like core is combined with a U letter-like core CR23.

Gaps G21 and G22 each having a predetermined gap length, as shown in the figure, are formed in portions in which the two magnetic legs of the U letter-like core CR21 and the two magnetic legs of the U letter-like core CR22 face each other, respectively, on the UU letter-like core side. In addition, gaps G23 and G24 each having a predetermined gap length are respectively formed in portions in which two magnetic leg end portions of the U letter-like core CR23 face a side face of the U letter-like core CR22 in the UU letter-like core (CR21, CR22).

In addition, the primary winding N1 and the secondary winding N2 are wound around two partition winding portions formed in a bobbin Bb21, respectively. The bobbin Bb21 is then mounted to one magnetic leg of the UU letter-like core (CR21, CR22). As a result, the primary winding N1 and the secondary winding N2 are wound in different winding regions around the one magnetic leg of the UU letter-like core (CR21, CR22). Thus, the degree of coupling which is regarded as loose coupling due to a predetermined coupling coefficient k between the primary winding N1 and the secondary winding N2 is obtained for the primary winding N1 and the secondary winding N2 by setting the gap lengths of the gaps G21 and G22.

Also, the choke coil winding N10 is wound around a bobbin Bb22. The bobbin Bb22 is then mounted to one leg of the U letter-like core CR23, thereby providing a state in which the choke coil winding N10 is wound around the one leg of the U letter-like core CR23. At this time, a main magnetic path due to the primary winding N10 and the secondary winding N2 is formed in the UU letter-like core (CR21, CR22). Also, a main magnetic path due to the choke coil winding N10 is formed on the U letter-like core CR23 side. Thus, a state is obtained in which magnetic fluxes of both the magnetic paths are hardly interlinked with each other. As a result, the degree of the magnetic coupling (coupling coefficient) between the choke coil winding N10, and each of the primary winding N1 and the primary winding N2 can be regarded as about zero similarly to those of FIGS. 12 and 13. Thus, it is possible to obtain a state in which even the transformer coupling may be regarded as being absent.

Figure 15:
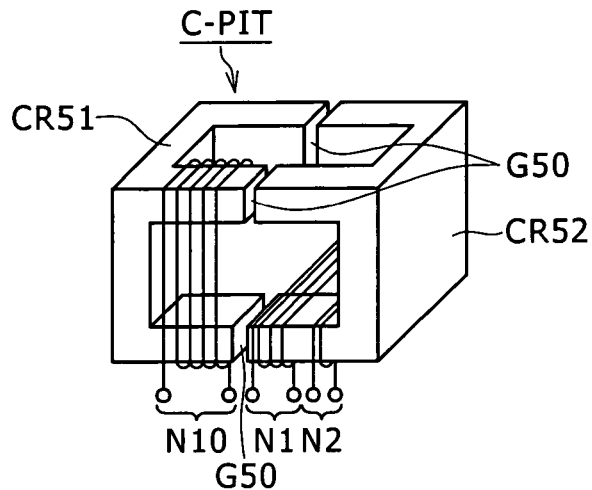
FIG. 15 is a perspective view showing yet another constructional example of the compound insulating converter transformer provided in each of the power supply circuits according to the first and second embodiments of the present invention.
Figure 16:
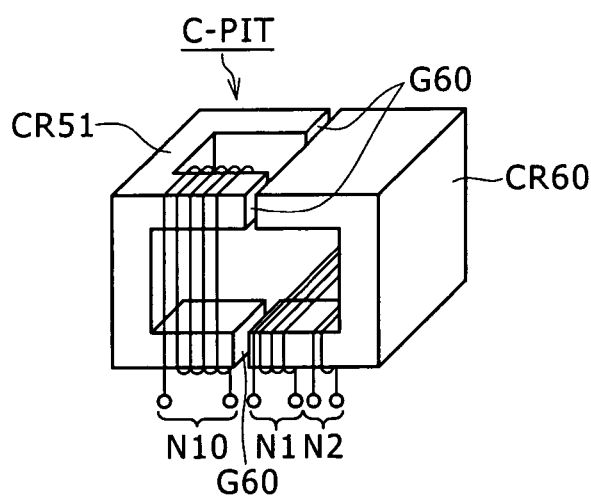
FIG. 16 is a perspective view showing a further constructional example of the compound insulating converter transformer provided in each of the power supply circuits according to the first and second embodiments of the present invention.
Figure 17:
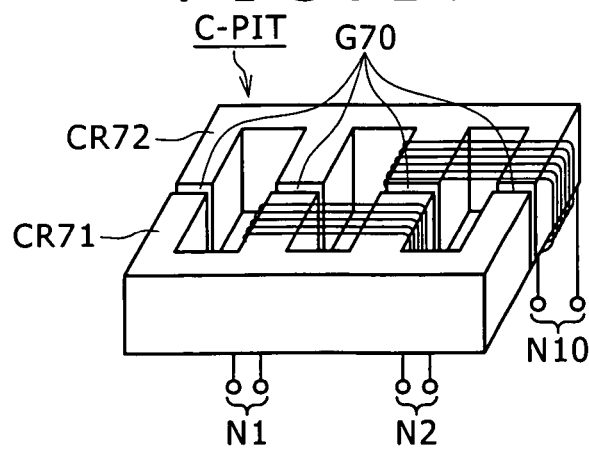
FIG. 17 is a perspective view showing an even further constructional example of the compound insulating converter transformer provided in each of the power supply circuits according to the first and second embodiments of the present invention.

Also, in addition to the construction of using the E letter-like core or U letter-like core as described above, for example, a construction as shown in FIG. 15, 16 or 17 may,also be adopted as the construction of the insulating converter transformer as the compound transformer in this embodiment.

A compound insulating converter transformer C-PIT shown in FIG. 15 includes double U letter-like cores CR51 and CR52 each having four magnetic legs. Then, a solid core is formed so that end portions of the magnetic legs of these double U letter-like cores CR51 and CR52 are joined to each other. At that, in this case, cores which are identical in size and shape to each other may be used as the double U letter-like cores CR51 and CR52, respectively.

When the solid core is formed in the manner as described above, four joining portions of the double U letter-like cores CR51 and CR52 are present in correspondence to the four sets of magnetic legs. In this case, gaps G50 each having a predetermined gap length are formed for those four joining portions, respectively. It should be noted that the gap lengths set in a plurality of gaps G50 may be identical to one another, or may be different from each other if necessary. This is also applied to each of constructions of compound insulating converter transformers C-PIT, shown in FIGS. 16 and 17, which will be described later.

In the solid core constructed in such a manner, firstly, for example, a choke coil winding N10 is wound around the adjacent two magnetic legs on the double U letter-like core CR51 by the predetermined number of turns.

On the other hand, the primary winding N1 and the secondary winding N2, as shown in the figure, are wound around the adjacent two magnetic legs on the double U letter-like core CR52 side by the predetermined number of turns so that its winding direction intersects just perpendicularly that of the choke coil winding N10.

With the construction as described above, the winding direction of the choke coil winding N10 intersects perpendicularly that of the primary winding N1 and the secondary winding N2. That is to say, with regard to the insulating converter transformer PIT as the compound transformer, the construction as the so-called orthogonal transformer is obtained.

The primary winding N1, the secondary winding N2 and the choke coil winding N10 are wound in such a manner, whereby firstly, a state is provided in which the primary winding N1 and the secondary winding N2 are magnetically coupled to each other based on a predetermined coupling coefficient set in correspondence to the core sizes, the gap lengths and the like. In addition, the choke coil N10 is made to have a predetermined inductance based on the constants such as the core sizes and the number of turns. Also, the winding direction of the choke coil winding, N10 is made to intersect perpendicularly that of the primary winding N1 and the secondary winding N2, whereby the magnetic path due to the primary winding N1 and secondary winding N2 side is formed opposite to that in the two magnetic legs around which the choke coil winding N10 is wound. As a result, the magnetic fluxes of these opposite magnetic paths cancel each other. Thus, the degree of the magnetic coupling between the choke coil N10, and each of the primary winding N1 and the secondary winding N2 can be made one that may be regarded as about zero.

In a compound insulating converter transformer C-PIT shown in FIG. 16, the double U letter-like core CR51 having the four magnetic legs is still used as one core in the solid core. However, a single U letter-like core CR60 having a U letter-like configuration in any cross section may be used as the other core instead of the double U letter-like core CR52 in combination with the one core. At that, with this core construction as well, gaps G60 are formed in portions, respectively, in which end faces of the four magnetic legs of the double U letter-like core CR51 and the single U letter-like core CR60 face each other.

In this core construction, the choke coil winding N10, and the primary winding N1 and the secondary winding N2 are wound based on a positional relationship of the double U letter-like core CR51, and a relationship of the winding direction. In this case, the positional relationship and the relationship of the winding direction are similar to those shown in FIG. 15. Even when such a construction is adopted, there is obtained the construction, for the orthogonal transformer, in which the winding direction of the choke coil winding N10, and the winding direction of a set of primary winding N1 and secondary winding N2 intersect perpendicularly each other. Thus, similarly to the case shown in FIG. 15, it is possible to obtain a state in which the choke coil winding N10 has a predetermined inductance, and the degree of the magnetic coupling between the primary winding N1 and the secondary winding N2 may be regarded as zero.

In addition, in the case of a compound insulating converter transformer C-PIT shown in FIG. 17, two half ladder-shaped cores CR71 and CR72 are prepared, and are then combined with each other so that their magnetic legs face each other, thereby forming one flat type ladder-shaped core. Also, in the ladder-shaped core, outer two magnetic legs and inner two magnetic legs, i.e., four magnetic legs in total face corresponding ones, respectively. In this case, gaps G70 each having a predetermined gap length are formed in portions, respectively, in which these four magnetic legs face corresponding ones.

The primary winding N1 and the secondary winding N2 are wound around inner two magnetic legs in one half ladder-shaped core CR71 so as to straddle them by the predetermined numbers of turns, respectively.

On the other hand, the choke coil winding N10 is wound around an outer one magnetic leg and an inner one magnetic leg adjacent to the outer one magnetic leg in the other half ladder-shaped core CR72 so as to straddle them by the predetermined number of turns.

In the construction of such a compound insulating converter transformer C-PIT, positions of the magnetic legs around which the choke coil winding N10 is wound, and positions of the magnetic legs around which the primary winding N1 and the second winding N2 are wound, respectively, are different from each other. However, this positional relationship is equal to that in which the winding directions are made to intersect perpendicularly each other as shown in FIGS. 15 and 16. Therefore, even with the construction shown in FIG. 17, the insulating converter transformer PIT provides a state in which the degree of the coupling between the choke coil winding N10, and each of the primary winding N1 and the secondary winding N2 is regarded as zero, and the choke coil winding N10 has a necessary inductance.

When the experiment results which will be described later are obtained with respect to the power supply circuit having the circuit structure shown in FIG. 1, the main portions are selected as follows.

Firstly, separate components were used as the insulating converter transformer PIT and the choke coil PCC, respectively. The EE letter-like construction shown in FIG. 11 was adopted for the insulating converter transformer PIT. Also, EER-35 was selected for the EE letter-like core (CR1, CR2), and the gap length of 1.6 mm was set in the gap G. N1=60T and N2=31T were selected for the number T of turns of the primary winding N1 and the number T of turns of the secondary winding N2, respectively.

In addition, ER-28 was selected for the choke coil PCC, and the gap having the gap length of 1.2 mm was formed in the central magnetic leg portion. The choke coil winding N10 was wound so that its inductance L10 became 360 $\mu$H. The choke coil winding N10 was wound by the number of turns of 50T.

With the above-mentioned insulating converter transformer PIT, a value equal to or smaller than 0.8, e.g., about 0.75 is set to the coupling coefficient k between the primary side and the secondary side in the insulating converter transformer PIT itself.

At that, EER or ER added to the core, as well known, is one of the type and standard of the core as a product. It is known that this type has EE. When the E letter-like configuration, the EE letter-like configuration or the like is stated for the core in this specification, the core is treated as the core having the E letter-like configuration or the EE letter-like configuration even in the case of any type of EER, ER or EE in correspondence to that its cross section has the E letter-like configuration or the EE letter-like configuration.

In addition, the capacitances of the primary side parallel resonance capacitor Cr, the primary side series resonance capacitor C11, and the secondary side series resonance capacitor C2 were selected as follows:

Cr=3,900 pF
C11=0.039 $\mu$F
C2=0.068 $\mu$F

With respect to the corresponding load powers, a maximum load power Pomax=300 W, and a minimum load power Pomin=0 W (no-load) were set, and a rated level of the secondary side DC output voltage Eo was set to 175 V.

Figure 2A:
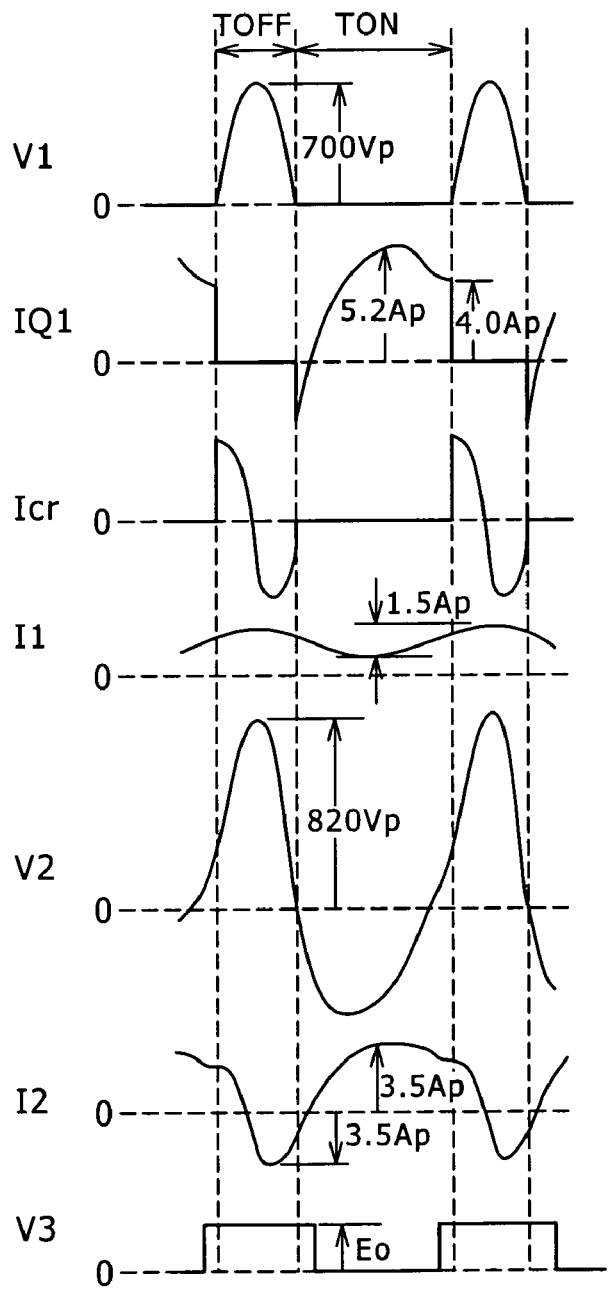
FIGS. 2A and 2B are respectively waveform charts showing operations of main portions in the power supply circuit according to the first embodiment of the present invention based on a switching period.
Figure 2B:
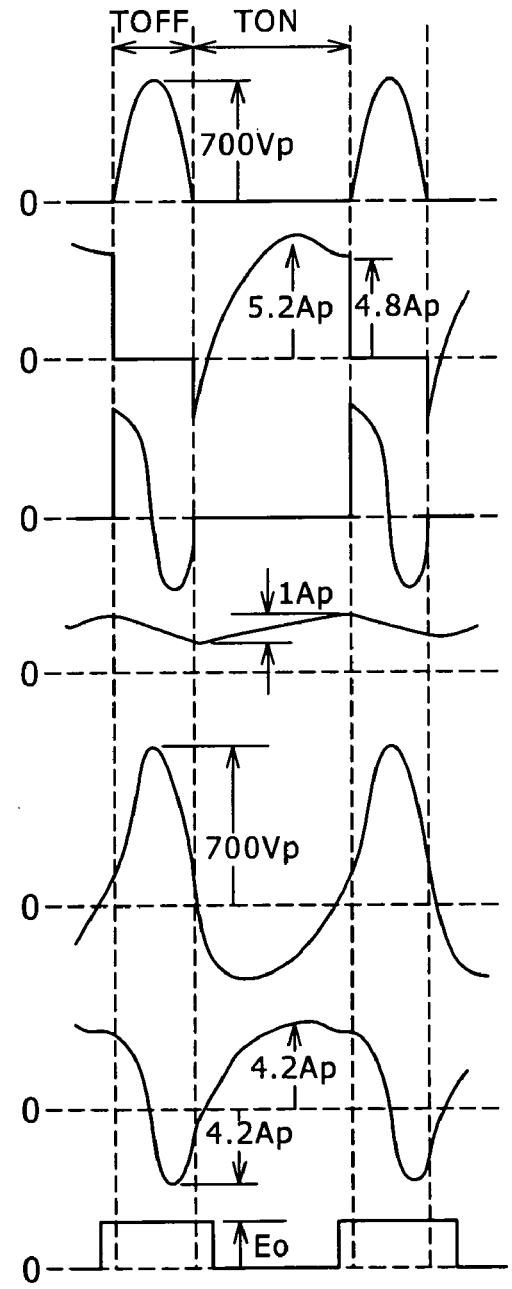

A waveform chart shown in FIG. 2A is given as the results of the experiments on the power supply circuit shown in FIG. 1. FIG. 2A shows waveforms of a switching voltage V1, a switching current IQ1, a capacitor current Icr, an input current I1, a primary winding voltage V2, a primary winding current I2, and a secondary side AC voltage V3 under conditions in which the maximum load power Pomax=300 W, and the AC input voltage VAC=100 V. In addition, FIG. 2B shows waveforms obtained in the same constituent elements as those of the power supply circuit having the circuit structure shown in FIG. 20 in order to make comparison with FIG. 2A.

A basic operation of the power supply circuit shown in FIG. 1 will hereinafter be described with reference to the waveform chart shown in FIG. 2A.

The input current I1 is a current which is intended to be caused to flow from the smoothing capacitor Ci into the primary side switching converter. In the case of this embodiment, a series combination of the choke coil winding N10 and the primary winding N1 of the insulating converter transformer PIT can be regarded as being inserted into the line, between the positive-polarity terminal of the smoothing capacitor Ci and the drain side of the switching element Q1, as the path through which the input current I1 is caused to flow into the switching element Q1 side. That is to say, the input current I1 is caused to flow through a composite inductance of the inductance L10 of the choke coil winding N10, and the leakage inductance L1 of the primary winding N1. For this reason, the input current I1 becomes a pulsating current. The input current I1 showing such a waveform can be regarded as a DC current. That is to say, the current which is caused to flow from the smoothing capacitor Ci into the switching converter turns into a DC current.

The switching element Q1 performs the switching operation by receiving the voltage Ei across the smoothing capacitor Ci as the DC input voltage. The switching voltage V1 is a drain to source voltage of the switching element Q1.

The switching current IQ1 is a current which is caused to flow from the drain side into the switching element Q1 (and the body diode DD). The ON/OFF timing of the switching element Q1 is shown based on the switching voltage V1 and the switching current IQ1. One switching period is separated into the ON-time period TON and the OFF-time period TOFF of the switching element Q1. The switching voltage V1 shows the waveform in which it is held at a 0 level during the ON-time period TON, and it turns into a resonance pulse during the OFF-state period TOFF. The voltage resonance pulse of the switching voltage V1 is obtained as showing a sine wave resonance waveform based on the resonance operation of the primary side parallel resonance circuit.

The switching current IQ1 is held at a 0 level during the OFF-time period TOFF. When the turn-ON timing is reached after the OFF-time period TOFF is completed to start the ON-time period TON, firstly, the switching current IQ1 is caused to flow through the body diode DD to show a negative-polarity waveform, and is then inverted to be caused to flow from the drain into the source to show a positive-polarity waveform.

The primary winding current I2 is a current which is caused to flow through the primary winding N1 in correspondence to the switching operation of the switching element Q1. In this case, the primary winding current I2 shows a waveform which is obtained by practically composing the switching current IQ1 and the capacitor current Icr with each other. The switching element Q1 performs the ON/OFF operation, whereby the resonance pulse voltage as the switching voltage V1 during the OFF-time period TOFF is applied to the series connection circuit of the primary winding N1 and the primary side series resonance capacitor C11 which form the first primary side series resonance circuit. As a result, the primary side series resonance circuit performs the resonance operation, and the primary winding current I2 shows an AC waveform corresponding to the switching period based on the sine wave component. In addition, the primary winding voltage V2 is a voltage developed across the primary winding N1. The primary winding voltage V2 also shows an AC waveform corresponding to the switching period based on the sine wave as shown in the figure.

At the timing at which the switching element Q1 is turned OFF after the ON-time period TON is completed to reach the OFF-time period TOFF, the primary winding current I2 is caused to flow as a capacitor current Icr in positive polarity through the primary side parallel resonance capacitor Cr. As a result, the operation for charging the primary side parallel resonance capacitor Cr with electricity starts. In response to this, the switching voltage V1 starts to rise from the 0 level so as to show the sine wave, and thus the voltage resonance pulse rises. When the positive polarity of the capacitor current Icr is inverted into the negative polarity, the primary side parallel resonance capacitor Cr proceeds to a state in which the discharge follows the charge. Thus, the voltage resonance pulse drops from its peak level so as to follow the since wave.

When the voltage resonance pulse as the switching voltage V1 drops to the 0 level, the ON-time period TON is started for which the switching element Q1 (and the body diode DD) is in the ON state. When the ON-time period TON is reached, firstly, the body diode DD conducts to cause the negative-polarity winding current I2 to flow through the body diode DD. At this time, the switching voltage V1 is at the 0 level. When the primary winding current I2 is caused to flow through the body diode DD for a given time period, turn-ON is caused between the drain and source of the switching element Q1 to cause the positive-polarity primary winding current I2 to flow through the switching element Q1. The primary winding current I2 is caused to flow through the switching element Q1 (and the body diode DD) during the ON-time period in such a manner, thereby obtaining the waveform of the switching current IQ1. Such an operation represents that during the turn-ON phase and turn-OFF phase of the switching element Q1, the ZVS operation by the primary side parallel resonance circuit, and the ZCS operation by the primary side series resonance circuit are obtained.

In addition, the operation of the secondary side rectifying circuit is shown based on the secondary side AC voltage V3.

The secondary side AC voltage V3 is a voltage developed across the series connection circuit of the secondary winding N2 and the secondary side series resonance capacitor C2, and is inputted to the secondary side rectifying circuit. A forward voltage of the secondary side AC voltage V3 is applied to the rectifying diodes Do1 and Do2, every time period of a half period of the secondary side AC voltage V3, and thus the rectifying diodes Do1 and Do2 alternately conduct in response thereto. As a result, an AC waveform is observed in which the secondary side AC voltage V3 is clamped based on an absolute value level corresponding to the secondary side DC output voltage Eo in correspondence to the conduction time period of the rectifying diode Do1, and becomes a 0 level (earth potential) in correspondence to the conduction time period of the rectifying diode Do2.

In addition, the experiment results were obtained in which a variable range Δfs of the switching frequency fs against the load fluctuation from the maximum load power Pomax=300 W to the minimum load power Pomin=0 W became 16.2 kHz in terms of the constant voltage control characteristics under the input condition of the AC input voltage VAC=100 V.

Also, the experiment results were obtained in which the AC→DC power conversion efficiency ηAC→DC was 91.9% during the phase of the maximum load power Pomax=300 W, and was 94.0% during the phase of the load power Po=75 W.

Comparing the waveform chart shown in FIG. 2A with that which is formerly shown in FIG. 19, as can be seen from the fact that the constituent elements common to both the cases show nearly the same operating waveforms, the basic operation of the power supply circuit shown in FIG. 1 is also of the class-E resonance type.

Therefore, in the case as well of the power supply circuit of this embodiment, similarly to the power supply circuit shown in FIG. 20, the class-E switching converter is applied to the primary side switching converter, whereby the abnormal operation is dissolved in which no ZVS is obtained during the intermediate load phase, and the ZVS operation is obtained over the overall range of the corresponding load power (Po=300 W to 0 W). The class-E switching converter includes one switching element and a parallel resonance circuit in terms of its basic structure. Hence, it is said that the practical application of the power supply circuit of this embodiment can be readily put to practical use in terms of the switching converter having the circuit structure of the voltage resonance type converter using the single ended system.

At that, as described above, in the power supply circuit, shown in FIG. 1 or FIG. 20, in which the class-E switching converter is applied to the primary side switching converter, the abnormal operation during the intermediate load phase is dissolved irrespective of presence or absence of the secondary side series resonance circuit. However, when the voltage doubler half-wave rectifying circuit is provided as the secondary side rectifying circuit as in the power supply circuit shown in FIG. 1 or FIG. 20, the current is caused to flow through the secondary winding N2 during each time period for which an induced voltage is of a positive/negative polarity. In the case of the rectifying circuit performing such a rectifying operation, the secondary side series resonance capacitor is connected to structure the secondary side series resonance circuit. As a result, the operation such as an increase in power due to the resonance operation of the secondary side series resonance circuit is obtained, which can lead to enhancement of the power conversion efficiency.

In addition, in the power supply circuit which is formerly shown as the conventional example in FIG. 21, the current which is caused to flow from the smoothing capacitor Ci into the switching converter is caused to flow through the switching element Q1 and the primary side parallel resonance capacitor Cr via the primary winding N1 of the insulating converter transformer PIT. In this case, the current which is caused to flow from the smoothing capacitor Ci into the switching converter becomes the primary winding current I1, and has a relatively high frequency due to the switching period. That is to say, the charging/discharging current is caused to flow through the smoothing capacitor Ci at a high frequency for the commercial AC power source period.

An aluminum electrolytic capacitor is frequently adopted as the smoothing capacitor Ci in order to comply with a request of high withstand voltage for a component element as the smoothing capacitor Ci. The aluminum electrolytic capacitor has a property in which as it is operated at high frequencies, its capacitance is easy to decrease and tangent of a loss angle is easy to increase as compared with other kinds of capacitors. For this reason, a special component in which an equivalent series resistance (ESR) is small, and an allowable ripple current is large must be selected as the aluminum electrolytic capacitor used as the smoothing capacitor Ci. In addition, a sufficiently large value must be selected as the capacitance of the component as the switching capacitor Ci. For example, in order to make the structure of the power supply circuit shown in FIG. 21 cope with the maximum load power Pomax=300 W which is equal to that in this embodiment, the capacitance of about 1,000 μF is selected. Such an aluminum electrolytic capacitor is more expensive than any of aluminum electrolytic capacitors for general applications, and is disadvantageous in terms of cost, including an increase in component price corresponding to an increase in capacitance.

On the other hand, in the power supply circuit of this embodiment shown in FIG. 1, the current which is caused to flow from the smoothing capacitor Ci into the switching converter is caused to flow through the switching element Q1 side via the series combination of the choke coil winding N10 and the primary winding N1. For this reason, the current which is caused to flow from the smoothing capacitor Ci into the switching converter turns into a DC current as shown as the input current I1 as well of FIG. 2A. The current which is caused to flow from the smoothing capacitor Ci into the switching converter turns into the DC current, whereby the power supply circuit of this embodiment is free from the problem of the decrease in capacitance and the increase in tangent of the loss angle. In addition, along with this, a ripple of the DC voltage Ei for the commercial AC power source period is also reduced. The ripple is 7.5 Vp-p with the structure of the power supply circuit shown in FIG. 21 for example, whereas it is 5 Vp-p with the structure of the power supply circuit shown in FIG. 1. From this situation, in this embodiment, the aluminum electrolytic capacitor for general applications can be selected as the smoothing capacitor Ci. In addition, a smaller value than that in the circuit shown in FIG. 21 can be selected as the capacitance as well of the component as the smoothing capacitor Ci. In the case of the power supply circuit shown in FIG. 1, a capacitance of 680 µF can be actually selected. In this embodiment, the cost down can be realized for the smoothing capacitor Ci.

In addition, in this embodiment, the experiment results are also obtained in which the power conversion efficiency characteristics can be regarded as being, satisfactory over nearly the overall range of the corresponding load power.

The high power conversion efficiency is obtained in this embodiment based on the following structure.

Firstly, it has been known that the structure of the power supply circuit including the secondary side series resonance circuit for the voltage resonance type converter is essentially advantageous in the power conversion efficiency. In particular, this structure has the characteristic property in which the power conversion efficiency increases as the load decreases from the maximum load power to the light load power. Thus, comparing the voltage resonance type converter with the current resonance type converter having a tendency to reduce the power conversion efficiency with the reduction in load, the power conversion efficiency characteristics against the load fluctuation is said to be very satisfactory. In addition, adoption of the single ended system for the voltage resonance type converter requires a necessary minimum one switching element. As a result, the switching loss is reduced as compared with the structure including a plurality of switching elements as e.g., in the half-bridge coupling system, the full-bridge coupling system, the push-pull system or the like. This becomes a factor for enhancing the power conversion efficiency.

Since the class-E switching converter of this embodiment includes the structure of a combination of the primary side parallel resonance circuit and one switching element, it is also said to include the structure of the voltage resonance type converter using the single ended system. Thus, it hands over the satisfactory power conversion efficiency characteristics of the voltage resonance type converter as described above.

Thus, in this embodiment, as described above, too, the abnormal operation during the intermediate load phase is dissolved to obtain the proper ZVS operation. The operation in which as shown in FIG. 22B, the switching element Q1 is turned ON at the timing before turn-ON (start of the ON-time period TON), and thus the positive-polarity switching current IQ1 is caused to flow through the source and drain of the switching current IQ1 is obtained in terms of the phenomenon of the abnormal operation. However, such an operation based on the switching current IQ1 may increase the switching loss. In this embodiment, no generation of the operation based on the switching current IQ1 corresponding to the abnormal operation prevents the switching loss from increasing. This becomes one of the factors of enhancing the power conversion efficiency.

Figure 22A:
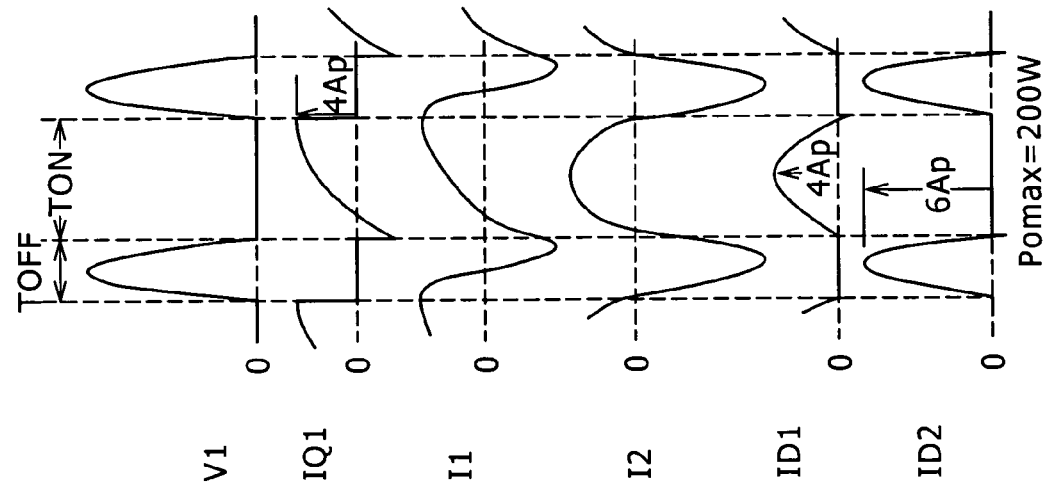
Figure 23:
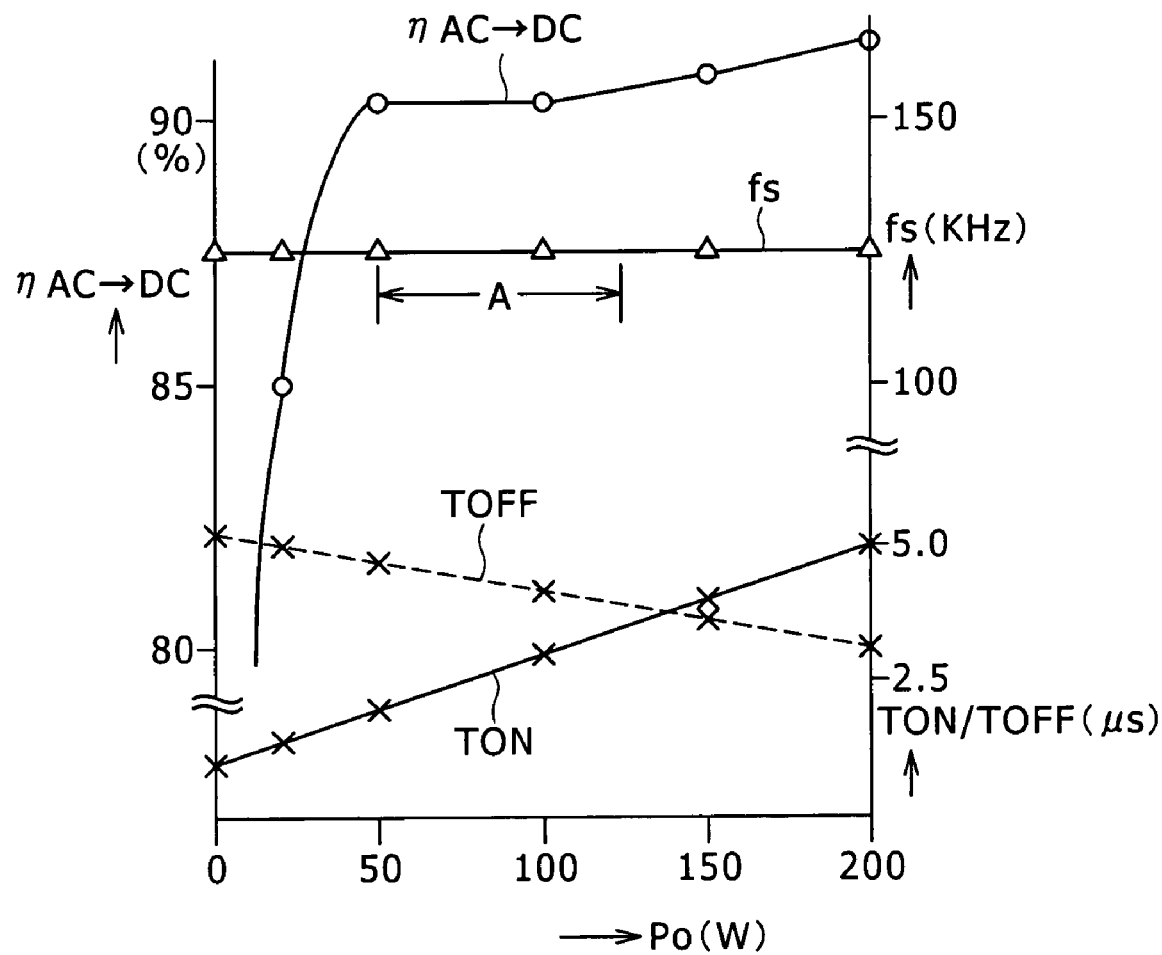
FIG. 23 is a graphical representation showing fluctuation characteristics of an AC→DC power conversion efficiency, a switching frequency, and an ON-time period of a switching element against a load fluctuation in the conventional power supply circuit shown in FIG. 21.
Figure 24:
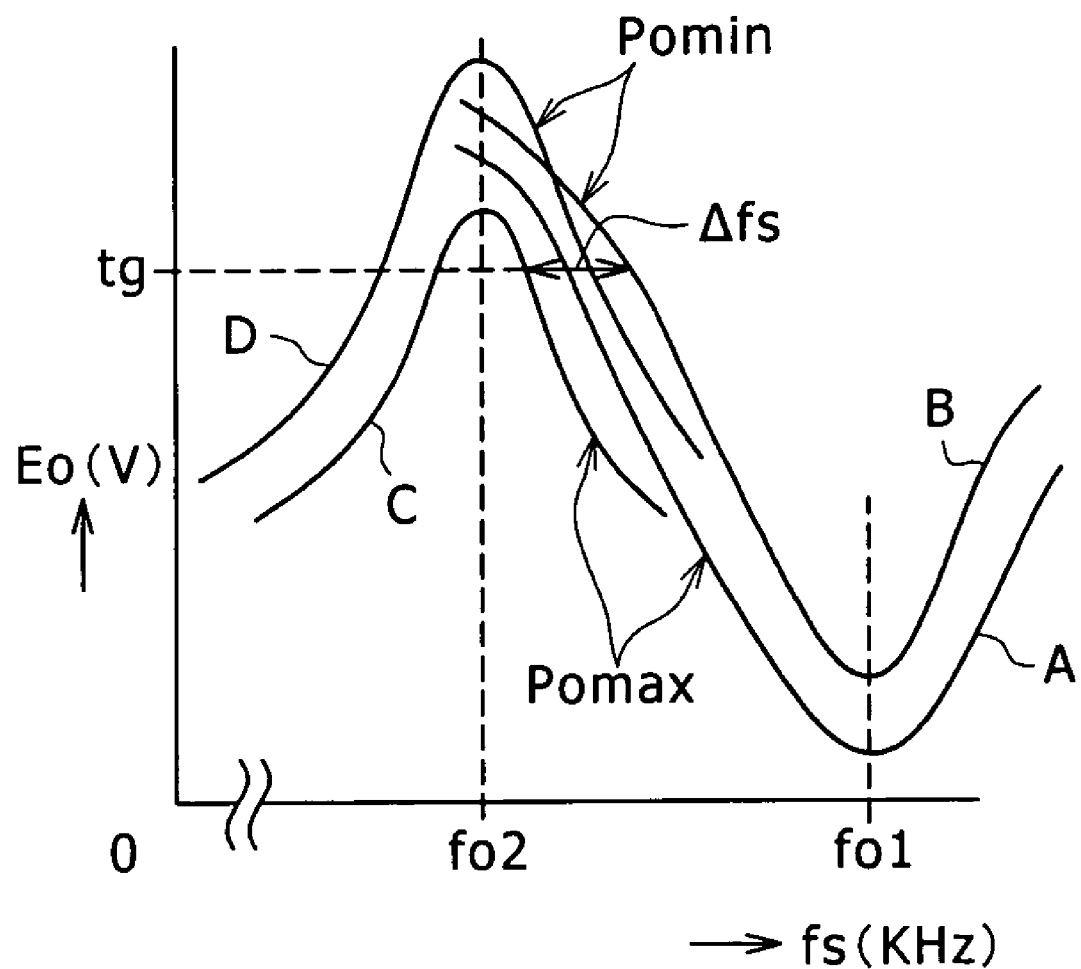
FIG. 24 is a graphical representation conceptually showing constant voltage control characteristics, of the conventional power supply circuit shown in FIG. 21.

In addition, as can be seen from comparison of the switching current IQ1 shown in FIG. 2A with that shown in FIG. 22A, the waveform of the switching current IQ1, shown in FIG. 2A, corresponding to this embodiment is one in which the peak is obtained at the timing at and before completion of the ON-time period TON. The waveform of the switching current IQ1 shown in FIG. 2A means that the level of the switching current IQ1 during the turn-OFF phase is suppressed. When,the level of the switching current IQ1 during the turn-OFF phase is suppressed, the switching loss during the turn-OFF phase is reduced and the power conversion efficiency is enhanced all the more.

Such a waveform of the switching current IQ1 is obtained from the class-E switching operation of the primary side switching converter.

In addition, the following fact largely contributes to the enhancement of the power conversion efficiency characteristics of the power supply circuit of this embodiment.

Here, reference is made to FIG. 2B showing the operation of the power supply circuit shown in FIG. 20 for comparison with that of this embodiment. In the case of the waveforms shown in FIG. 2B, the same load power condition, AC input voltage condition, and secondary side DC output voltage Eo as those in the case where the experiment results shown in FIG. 2A are obtained are set, and also constants of the components of the main portions are selected and set in the power supply circuit shown in FIG. 20 so as to obtain nearly the same operating conditions as those in the power supply circuit shown in FIG. 1.

With the circuit structure of the primary side switching converter of the power supply circuit shown in FIG. 20, the primary side parallel resonance circuit structured by the capacitance of the primary side parallel resonance capacitor Cr and the inductance of the choke coil L10 performs the resonance operation (voltage resonance operation) during the OFF-time period TOFF. Thus, as shown in the figure, the capacitor current Icr is caused to flow through the primary side parallel resonance capacitor Cr. As a result, with regard to the switching voltage V1, the resonance pulse voltage during the phase of the OFF-time period TOFF is generated.

Here, in the circuit structure of the power supply circuit shown in FIG. 20, the primary side parallel resonance circuit includes no inductance L1 of the primary winding N1 unlike this embodiment.

On the other hand, in the power supply circuit of this embodiment shown in FIG. 1, the primary winding N1 is inserted so as to be connected in series with the choke coil winding N10 in the primary side parallel resonance circuit. For this reason, a resonance pulse voltage generated in the choke coil winding N10 is superimposed on the AC voltage generated in the primary winding N1 to increase the level of the primary winding voltage V2. As for the actual measurement results, the level of the primary winding voltage V2 in the power supply circuit shown in FIG. 20 is 700 Vp as shown in FIG. 2B, whereas the level of the primary winding voltage V2 in the power supply circuit shown in FIG. 1 is 820 Vp as shown in FIG. 2A. It should be noted that while the values of the levels are obtained when being of the positive polarity, even when being of the negative polarity, similarly, the level of the primary winding voltage V2 in the power supply circuit shown in FIG. 1 further increases as compared with that of the primary winding voltage V2.

In addition, while the first primary side series resonance circuit (N10 (L10), C11) of this embodiment is structured based on the primary side connection form in the power supply circuit shown in FIG. 20, no second primary side series resonance circuit is structured based thereon. In this case, the series resonance current which is caused to flow through the primary side is caused to flow in the form of the primary winding current I2 as it is.

On the other hand, in this embodiment, one set of first primary side series resonance circuit and second primary side series resonance circuit is provided as the primary side series resonance circuit. As a result, as described above, the series resonance current to be caused to flow through the primary side bifurcates to be caused to flow separately through the primary winding N1 and the choke coil winding N10. This operation is firstly shown in the form of the waveform of the input current I1. For example, the input current I1, of the power supply circuit of FIG. 20, shown in FIG. 2B is a pulsating current having a level fluctuation width of 1 A. In addition, the waveform of the pulsating current shows a change in increase and decrease near a straight line. On the other hand, the input current I1, of the power supply circuit of FIG. 1, shown in FIG. 2A has a level fluctuation width of 1.5 A, and increases as compared with that shown in FIG. 2B. In addition, the pulsating current waveform of the input current I1 shown in FIG. 2A shows a sine wave. That is to say, the series resonance current is caused to flow through the choke coil winding N10, whereby the amplitude width of the input current I1 increases, and the waveform thereof appears in the form of the sine wave since the input current I1 contains the series resonance current component. At that, it may be judged that the mean value of the input current I1 shown in FIG. 2A is nearly equal to that shown in FIG. 2B or is smaller than that shown in FIG. 2B.

In this embodiment, the level (amplitude) of the primary winding voltage V2 increases as described above, and the primary side series resonance current bifurcates to be caused to separately flow, thereby largely reducing the primary winding current I2. Actual comparison of FIG. 2A corresponding to the power supply circuit shown in FIG. 1 with FIG. 2B corresponding to the power supply circuit shown in FIG. 20 with respect to this point shows that the primary winding current I2 is 4.2 Ap in FIG. 2B, whereas the primary winding current I2 is 3.5 Ap in FIG. 2A. Thus, the primary winding current I2 is reduced by 0.7 A.

In addition, along with this, an amount of switching current IQ1 is also reduced accordingly. Maximum peak levels of the switching currents IQ1 shown in FIGS. 2A and 2B take the same value of 5.2 Ap. However, a peak level of the switching current IQ1 during the turn-OFF phase shown in FIG. 2B is 4.8 Ap, whereas the peak value of the switching current IQ1 during the turn-OFF phase shown in FIG. 2A is 4.0 Ap. Thus, the switching current IQ1 is reduced by 0.8 A. In addition, the capacitor current Icr caused to flow through the primary side parallel resonance capacitor Cr during the OFF-time period TOFF is less in the power supply circuit shown in FIG. 1 than in the power supply circuit shown in FIG. 20. From these facts, the current caused to flow through the primary side under given load conditions is said to be reduced as a whole in the power supply circuit of this embodiment as compared with that in the power supply circuit shown in FIG. 20 for example.

The power supply circuit shown in FIG. 1 also includes the choke coil winding N10 corresponding to the choke coil L10, whereby the power loss due to the choke coil winding N10 exists. However, the current, corresponding to the switching period, caused to flow through the primary side switching converter is reduced as described above, thereby reducing a switching loss in the switching element Q1, an iron loss and a copper loss in the insulating converter transformer PIT, a loss in the primary side parallel resonance capacitor, and the like. The total sum of power losses thus reduced is much larger than the power loss due to the choke coil winding N10. As a result, the power conversion efficiency is largely and synthetically enhanced for the power supply circuit shown in FIG. 20. It was verified from the experiments made by the inventor of this application that the power conversion efficiency characteristics are more satisfactory in the power supply circuit shown in FIG. 1 than in the power supply circuit shown in FIG. 21 as the conventional example.

As described formerly, the AC→DC power conversion efficiency ηAC→DC of the power supply circuit of this embodiment shown in FIG. 1 was 91.9% when the maximum load power Pomax=300 W, and was 94.0% when the load power Po=75 W. On the other hand, the AC→DC power conversion efficiency. ηAC→DC of the power supply circuit shown in FIG. 21 was 91.7% when the maximum load power Pomax=300 W, and was 93.8% when the load power Po=75 W. When such characteristics are viewed in terms of a range of the corresponding load power (from Pomax=300 W to Pomin=0 W), it is understood that the power supply circuit shown in FIG. 1 has the sufficiently satisfactory power conversion efficiency characteristics as compared with that of the power supply circuit shown in FIG. 21.

At that, with regard to the constant voltage control characteristics of the power supply circuit shown in FIG. 21, Δfs=20.8 kHz is obtained against the load fluctuation from the maximum load power Pomax=300 W to the minimum load power Pomin=0 W under the input condition of the AC input voltage VAC=100 V. Thus, the control range (Δfs=16.2 kHz) is further reduced in the power supply circuit shown in FIG. 1 as compared with that of the power supply circuit shown in FIG. 21.

In addition, reduction in current (mainly, the primary winding current I2) caused to flow through the primary side as described above, for example, results in reduction in magnetic flux as well generated in the choke coil PCC in which the choke winding N10 is wound. In addition, in the connection form of this embodiment, the series connection circuit of the choke coil winding N10 and the primary winding N1 is also formed in the path through which the input current I1 is caused to flow into the switching converter side. As a result, the inductance for turning the input current I1 into the DC current can be obtained by composing the inductance L10 of the choke coil winding N10 and the leakage inductance L1 of the primary winding N1 with each other. For this reason, the inductance required for the choke coil winding N10 itself of this embodiment can be set smaller than that of the choke coil winding N10 shown in FIG. 20 for example.

The inductance of L10=1 mH is set as a concrete value of the inductance L10 of the choke coil winding N10 in the power supply circuit shown in FIG. 20 for example, whereas the inductance of L10=0.36 mH (360 μH) can be set as the concrete value of the inductance L10 of the choke coil winding N10 in the power supply circuit shown in FIG. 1. This value of the inductance L10 may be regarded as being equal to the value set in the leakage inductance L1 of the primary winding N1.

A smaller value than that until now can be set to the inductance L10 of the choke coil winding N10 in the manner as described above, whereby when for example, the choke coil PCC is provided as a separate component provided independent of the insulating converter transformer PIT, the choke coil PCC can be miniaturized and lightened. More specifically, in the case of the power supply circuit shown in FIG. 20, in order to obtain the inductance of L10=1 mH, the choke coil winding N10 was wound around the EER-28 ferrite core by the number of turns of 80T, thereby constructing the choke coil PCC. On the other hand, in the case of the power supply circuit shown in FIG. 1, the choke coil PCC can be adopted which is constructed by winding the choke coil winding N10 around the ER-28 ferrite core by the number of turns of 50 T.

In addition, reduction in value of the inductance L10 of the choke coil winding N10 becomes advantageous even when the compound insulating converter transformer C-PIT is constructed which includes in its construction the choke coil winding N10. The constructional examples of the compound insulating converter transformer C-PIT were shown in FIGS. 12 to 17.

For example, in the case where the compound insulating converter transformer C-PIT is intended to be constructed when the choke coil winding N10 has the properly large inductance L10 equal to that shown in FIG. 20, the following problem may be caused. That is to say, the inductance L10 required for the choke coil winding N10 may be difficult to obtain based on the core size (cross section) corresponding to the inductance required for the essential insulating converter transformer including the first winding N1 and the second winding N2 depending on the balance between each of the inductances (L1, L2) of the primary winding N1 and the secondary winding N2, and the inductance L10 of the choke coil winding N10. As a result, a core having a large size must be selected in correspondence to the size of the inductance L10. Or, there is a possibility that the compound insulating converter transformer C-PIT becomes difficult to design.

On the other hand, if the inductance L10 of the choke coil winding N10 is small to the extent to which the inductance L10 is required in this embodiment, the above-mentioned problem is dissolved. Thus, for example, the compound insulating converter transformer C-PIT can be readily designed and manufactured with a necessary minimum small core size.

As described above, in this embodiment, miniaturization and weight lightening of the choke coil PCC in which the choke coil winding N10 is wound, or the compound insulating converter transformer C-PIT can be readily performed. In addition, cost down following this miniaturization and weight lightening can also be expected.

In addition, in this embodiment, the waveform of the input current I1 is the sine wave waveform. Thus, an effect of reducing the high-frequency noises due to this waveform can also be obtained.

Figure 3:
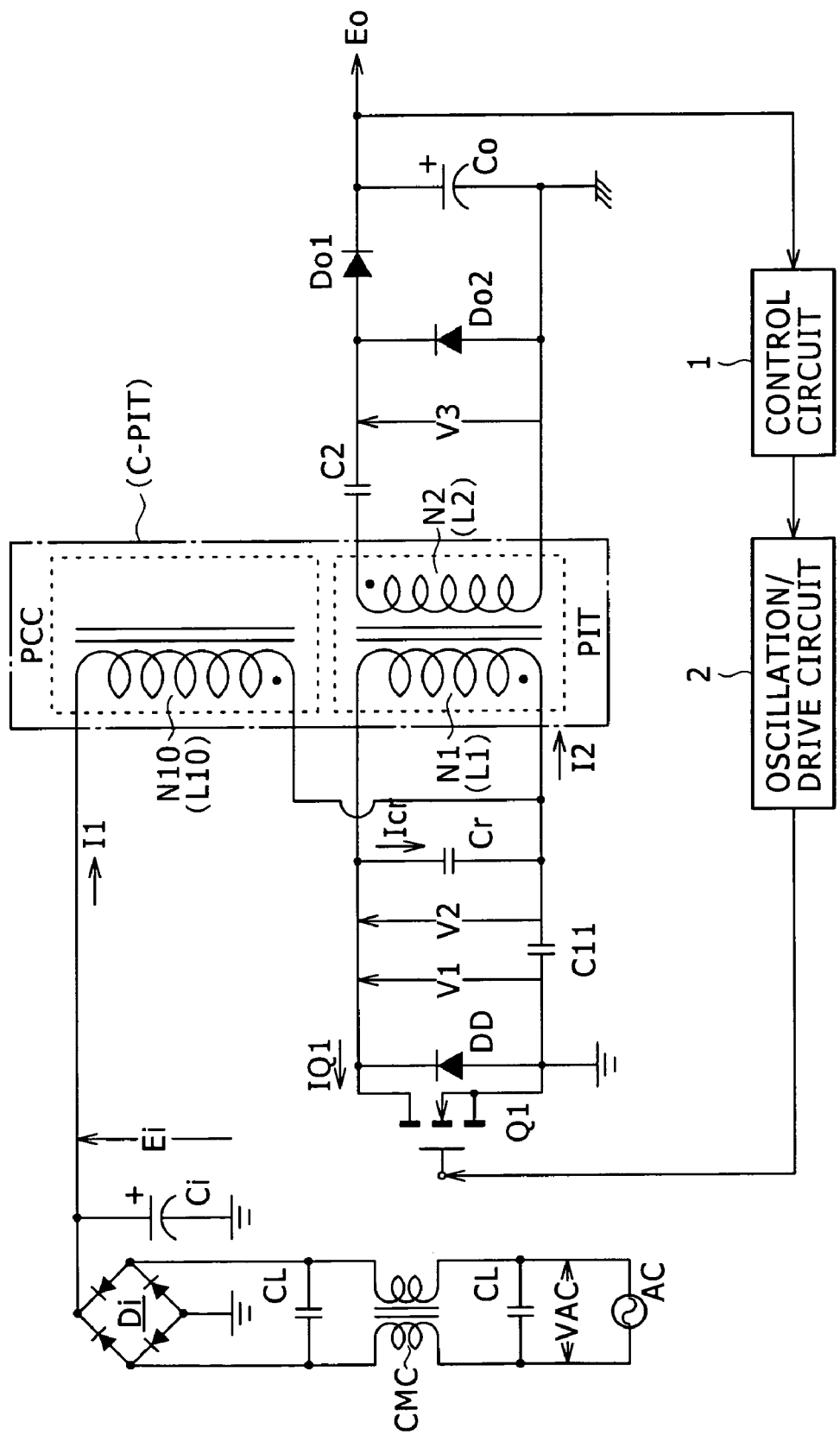
FIG. 3 is a circuit diagram showing a structural example of a power supply circuit according to a second embodiment of the present invention.

FIG. 3 shows a structural example of a power supply circuit according to a second embodiment of the present invention. At that, in the figure, the same constituent elements as those shown in FIGS. 20 and 1 are designated with the same reference numerals, respectively, and a description thereof is omitted here.

In the case of the power supply circuit as well shown in FIG. 3, the choke coil winding N10 is wound in the choke coil PCC.

In addition, the insulating converter transformer PIT can also adopt the same construction as that described in the first embodiment. That is to say, the insulating converter transformer PIT may be constructed in the form of a transformer component provided independent of the choke coil PCC, or may be constructed in the form of an integral compound transformer (the compound insulating converter transformer C-PIT), including the construction of the choke coil PCC. In addition, in the case as well of the second embodiment, a value of about 0.75 which is equal to or smaller than 0.8 for example is set to the coupling coefficient k between the primary side and the secondary side of the insulating converter transformer PIT itself.

Thus, in the power supply circuit shown in FIG. 3, the primary side switching converter is structured as follows.

That is to say, one end of the primary side parallel resonance capacitor Cr is connected to a node between the drain of the switching element Q1 and the winding finish end portion of the primary winding N1. Also, the other end of the primary side parallel resonance capacitor Cr is connected to a node between the winding start end portion of the primary winding N1 and the one end of the primary side series resonance capacitor C11. The other end of the primary side series resonance capacitor C11 is connected to the source of the switching element Q1 at the primary side earth potential.

In this connection form, the primary side parallel resonance capacitor Cr is connected in parallel with the primary winding N1. Also, the primary side series resonance capacitor C11 is connected in series with the parallel connection circuit of the primary side parallel resonance capacitor Cr and the primary winding N1.

With such a construction, in the primary side parallel resonance circuit, firstly, a first primary side parallel resonance circuit is structured by the composite inductance obtained from a series combination of the inductance L10 of the choke coil winding N10 (the choke coil PCC) and the leakage inductance L1 of the primary winding N1, and the capacitance obtained from the series connection circuit of the primary side parallel resonance capacitor Cr and the primary side series resonance capacitor C11. Moreover, a second parallel resonance circuit is also structured by the leakage inductance L1 of the primary winding N1 and the capacitance of the primary side parallel resonance capacitor Cr.

In addition, the primary side series resonance circuit includes a first primary series resonance circuit structured by the inductance L10 of the choke coil winding N10 and the capacitance of the primary side series resonance capacitor C11, and a second primary side series resonance circuit structured by the capacitance of the primary side series resonance capacitor C11 and the leakage inductance L1 of the primary winding N1.

When the experiments on the power supply circuit of the second embodiment shown in FIG. 3 are carried out, the main portions are selected as follows.

Firstly, in this case as well, separate components were adopted as the insulating converter transformer and the choke coil PCC, respectively. The EE letter-like construction was adopted for the insulating converter transformer PIT. EER-35 was selected for the EE letter-like core (CR1, CR2), and the gap length of 1.6 mm was set in the gap G1.

Also, N1=55 T and N2=31 T were selected as the number T of turns of the primary winding N1 and the number T of turns of the secondary winding N2, respectively.

In addition, ER-28 was selected for the choke coil PCC, and the gap having the gap length of 1.2 mm was formed in the central magnetic portion. The choke coil winding N10 was wound so as to obtain the inductance L10=360 μH. Then, the choke coil winding N10 was wound by 50 T.

With the above-mentioned construction of the insulating converter transformer PIT, in this case as well, for example, a value of about 0.75 smaller than 0.8 was set to the coupling coefficient k between the primary side and the secondary side of the insulating converter transformer PIT itself.

In addition, the capacitances of the primary side parallel resonance capacitor Cr, the primary series resonance capacitor C11, and the secondary side series resonance capacitor C2 were selected as follows:

Cr=3,900 pF
C11=0.033 μF
C2=0.068 μF

With respect to the corresponding load power, a maximum load power Pomax=300 W, and a minimum load power Pomin=0 W (no-load) were set. A rated level of the secondary side DC output voltage Eo was 175 V.

Figure 4:
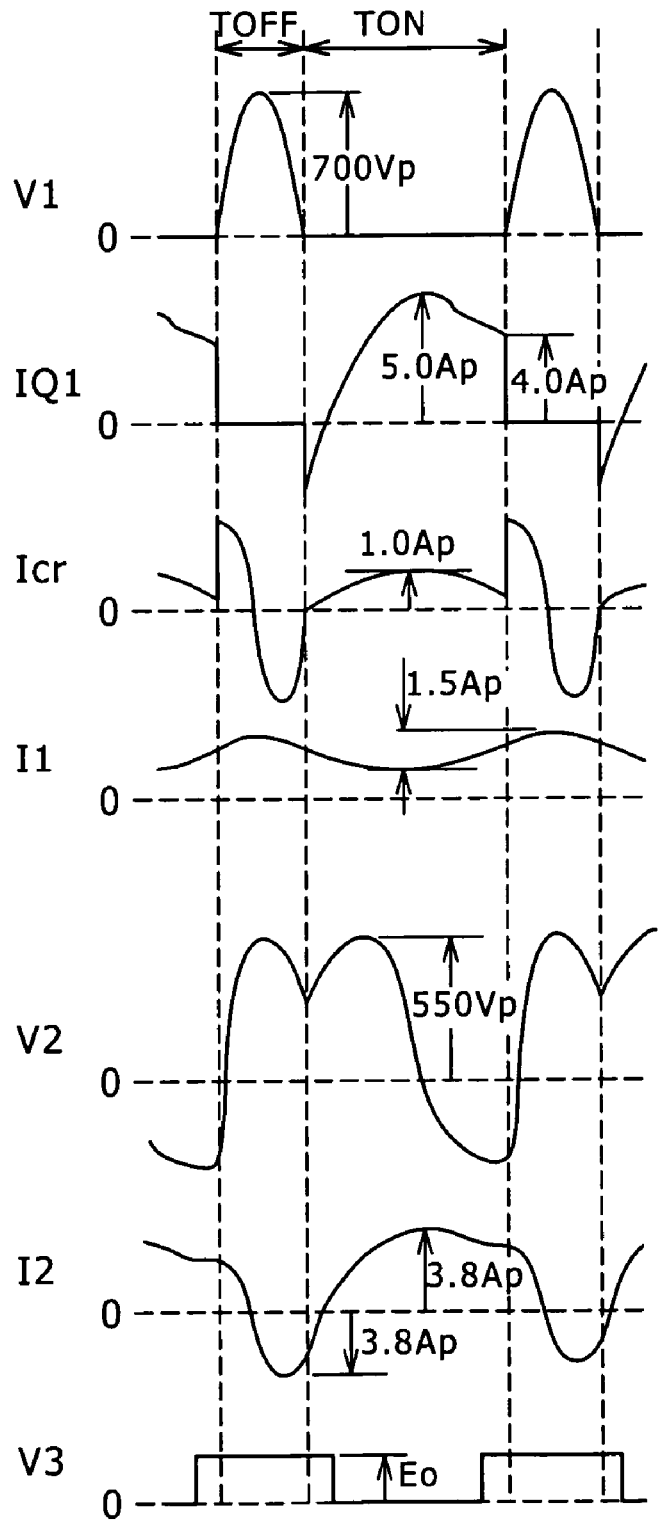
FIG. 4 is a waveform chart showing operations of main portions in the power supply circuit according to the second embodiment of the present invention based on a switching period.

A waveform chart shown in FIG. 4 is given as the results of the experiments on the power supply circuit shown in FIG. 3. FIG. 4 shows the switching voltage V1, the switching current IQ1, the capacitor current Icr, the input current I1, the primary winding voltage V2, the primary winding current I2, and the secondary side AC voltage V3 under the conditions of the maximum load power Pomax=300 W and the AC input voltage VAC=100 V.

Since the basic operation shown in FIG. 4 is the same as the operation, of the power supply circuit of the first embodiment, which is formerly,shown in the form of the waveform chart of FIG. 2, a description thereof is omitted here. In addition, the fact that the operating waveforms in the power supply circuit of the second embodiment shown in FIG. 4 are basically the same as those in the power supply circuit of the first embodiment means that in the second embodiment as well, the resonance pulse voltage generated in correspondence to the resonance operation of the primary side parallel resonance circuit is superimposed on the AC voltage in the primary winding N1 to increase the level of the primary winding voltage V2. Also, that fact means that the primary side series resonance current is caused to separately flow through the choke coil winding N10 side as well in correspondence to the resonance operation of the second primary side series resonance circuit. As a result, in the second embodiment as well, there is obtained the effect of reducing the power loss due to reduction in amount of current caused to flow through the primary side switching converter. In addition, since a small inductance value of e.g., about 360 μH can be set to the inductance L10 of the choke coil winding N10, miniaturization, weight lightening, and design easiness of the choke coil PCC and the compound insulating converter transformer C-PIT can be realized.

In addition, as described formerly, the power supply circuit of the second embodiment includes a second primary side parallel resonance circuit structured by the leakage inductance L1 of the primary winding N1, and the capacitance of the primary side parallel resonance capacitor Cr. The resonance operation of the second primary side parallel resonance circuit is valid during the ON-time period of the switching element Q1. The second primary side parallel resonance circuit performs the resonance operation, whereby during the ON-time period TON as well, the capacitor current Icr showing the waveform of its positive-polarity sine wave component of FIG. 4 is caused to flow through the primary side parallel resonance capacitor Cr. This fact means that during the ON-time period TON, the current originating from the input circuit I1 is caused to separately flow not only through the primary winding N1 and the switching element Q1, but also through the primary side parallel resonance capacitor Cr. In correspondence thereto, during the ON-time period TON, the primary winding voltage V2 shows a waveform in which the positive polarity is inverted into the negative polarity.

Thus, in the case as well of the power supply circuit of the second embodiment, an effect is obtained in which a synthetic current caused to flow through the primary side is further reduced in correspondence to that the current caused to flow through the primary side switching converter is caused to separately flow through the primary side parallel resonance capacitor Cr as well.

With regard to the measurement results shown in FIG. 4, a peak level of the capacitor current Icr during the ON-time period TON is 1 Ap, and a peak level of the insulating current IQ1 corresponding to the capacitor current Icr is 5.0 Ap which is smaller than that (FIG. 2B) in the power supply circuit shown in FIG. 20 by 0.2 A. In addition, the primary winding current I2 is 3.8 Ap in each of the positive polarity and the negative polarity. Thus, the primary winding current I2 is reduced by 4.2 A as compared with that in the power supply circuit shown in FIG. 20. In this case, reduction in current caused to flow through the primary side can be regarded as remarkably appearing in the form of reduction in peak level of the switching current IQ1.

Thus, in the power supply circuit of the second embodiment, firstly, similarly to the power supply circuit of the first embodiment, the amplitude of the primary winding voltage V2 is increased based on the operation for superimposing the resonance pulse voltage on the AC voltage in the primary winding N1, and the current caused to flow through the primary side switching converter is reduced along with that increase, thereby reducing the power loss.

In addition, even when the switching element Q1 is an ON state, there is obtained the operation for causing a part of the current caused to flow through the primary side switching converter to separately flow through the primary side parallel resonance capacitor Cr. As a result, the current (the switching current IQ1) caused to flow through the primary side switching converter is further reduced, thereby further reducing the power loss.

Thus, it was confirmed from the experiment that the more satisfactory power correction efficiency characteristics were obtained in the power supply circuit of the second embodiment as compared with the power supply circuit of the first embodiment. More specifically, the AC→DC power conversion efficiency ηAC→DC was 92.4% when the minimum load power Pomax=300 W, and was 94.5% when the load power Po=75 W. In addition, with regard to the constant voltage control characteristics of the power supply circuit of the second embodiment, Δfs=12.9 kHz was obtained against the load fluctuation from the maximum load power Pomax=300 W to the minimum load power Pomin=0 W under the input condition of the AC input voltage VAC=100 V.

In addition, stating for confirmation, in the case as well of the power supply circuit of the second embodiment shown in FIG. 3, as can be seen from comparison of the waveform chart shown in FIG. 4 with that formerly shown in FIG. 19, the basic operation of the power supply circuit of the second embodiment is of the class-E resonance type. From this fact, the abnormal operation is dissolved in which no ZVS is obtained during the intermediate load phase, and thus the ZVS operation is obtained over the overall range of the corresponding load power (Po=300 W to 0 W). In addition, for example, a value equal to or smaller than a given value is set to the degree of coupling (the coupling coefficient k) between the primary side and the secondary side of the insulating converter transformer PIT, thereby providing the operation for reducing the mutual influence between the primary side and the secondary side. This operation can also be given as one factor for obtaining the more stable switching operation by dissolving the above-mentioned abnormal operation.

In addition, the power supply circuit of the second embodiment performs the class-E operation, which results in that the input current I1 caused to flow from the smoothing capacitor Ci into the switching converter turns into the DC current. As a result, a product for general applications can be selected as the smoothing capacitor Ci, and also a smaller capacitance can be selected for the switching capacitor Ci.

Subsequently, variations of the second side rectifying circuit are shown as changes of the first and second embodiments of the present invention in FIGS. 5 to 8.

It should be noted that though only the structure of the secondary winding N2 and the secondary side rectifying circuit is extracted and shown in FIGS. 5 to 8, other constituent elements which are not shown in the figure may adopt the structure as the first and second embodiments described formerly, including the construction of the insulating converter transformer PIT. That is to say, the choke coil PCC and the insulating converter transformer PIT may be components provided independent of each other, or may be constructed by the compound insulating converter transformer C-PIT in which the choke coil winding N10 to be wound in the choke coil PCC is included in the construction of the insulating converter transformer.

Figure 5:
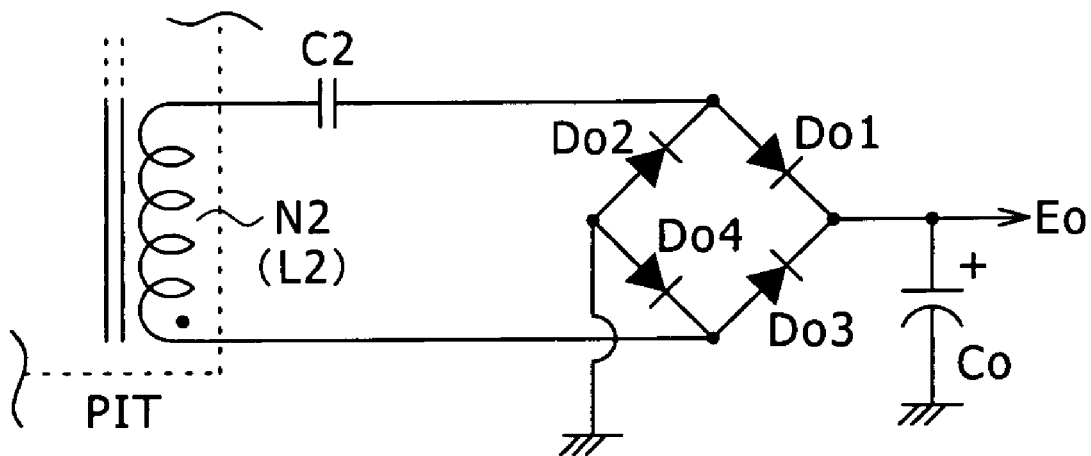
FIG. 5 is a circuit diagram showing a modified structural example of a secondary side corresponding to each of the power supply circuits according to the first and second embodiments of the present invention.

Firstly, the power supply, circuit shown in FIG. 5 includes a bridge full-wave rectifying circuit structured by a bridge rectifying circuit having four rectifying diodes Do1, Do2, Do3 and Do4, and one smoothing capacitor Co. The bridge full-wave rectifying circuit is provided as a secondary side rectifying circuit connected to the series connection circuit (secondary side series resonance circuit) of the secondary winding N2 and the secondary side series resonance capacitor C2.

In this case, the winding finish end portion of the secondary winding N2 is connected to a node between an anode of the rectifying diode Do1 and a cathode of the rectifying diode Do2 through the secondary side series resonance capacitor C2. In addition, the winding start end portion of the secondary winding N2 is connected to a node between an anode of the rectifying diode Do3 and a cathode of the rectifying diode Do4. A cathode of the rectifying diode Do1 and a cathode of the rectifying diode Do3 are connected to a positive-polarity terminal of the smoothing capacitor Co. A negative-polarity terminal of the smoothing capacitor Co is connected to a node between an anode of the rectifying diode Do2 and an anode of the rectifying diode Do4 at the secondary side earth potential.

In the full-wave rectifying circuit structured in the manner as described above, a set of rectifying diodes Do1 and Do4 of the bridge rectifying circuit conduct during one half period of an AC voltage induced (excited) in the secondary winding N2. Thus, there is obtained an operation for charging the smoothing capacitor Co with the rectified current. In addition, a set of rectifying diodes Do2 and Do3 conduct during the other half period of the AC voltage induced in the secondary winding N2. Thus, there is obtained an operation for charging the smoothing capacitor Co with the rectified current.

As a result, the secondary side DC output voltage Eo having a level corresponding to an equimultiple of a level of the AC voltage induced in the secondary winding N2 is generated as a voltage developed across the smoothing capacitor Co.

Figure 6:
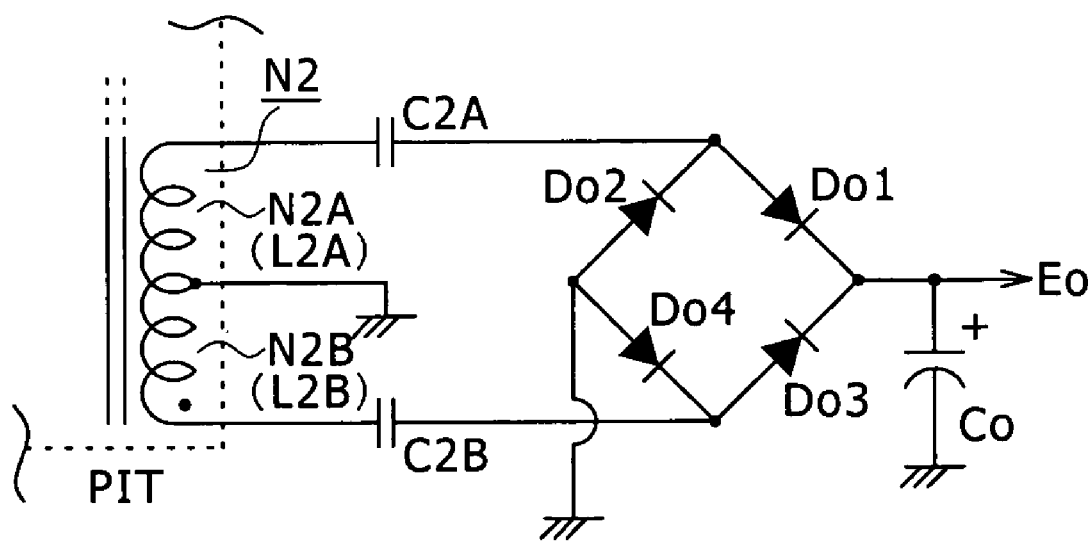
FIG. 6 is a circuit diagram showing another modified structural example of the secondary side corresponding to each of the power supply circuits according to the first and second embodiments of the present invention.

The power supply circuit shown in FIG. 6 includes a voltage doubler full-wave rectifying circuit as the secondary side rectifying circuit.

In the voltage doubler full-wave rectifying circuit in this case, firstly, a center tap is provided in the secondary winding N2, thereby dividing the secondary winding N2 into secondary winding portions N2A and N2B with the center tap as a boundary. The secondary winding portions N2A and N2B have the same predetermined number of turns set thereto. The center tap of the secondary winding N2 is connected to the secondary side earth.

In addition, a secondary side series resonance capacitor C2A is connected in series with an end portion of the secondary winding N2 on the secondary winding portion N2A side, and a secondary side series resonance capacitor C2B is connected in series with an end portion of the secondary winding N2 on the secondary winding portion N2B side. As a result, there is formed a first secondary side series resonance circuit structured by a leakage inductance component of the secondary winding portion N2A and a capacitance of the secondary side series resonance capacitor C2A. Also, there is formed a second secondary side series resonance circuit structured by a leakage inductance component of the secondary winding portion N2B and a capacitance of the secondary side series resonance capacitor C2B.

The end portion of the secondary winding N2 on the secondary winding portion N2A side is connected to the node between the anode of the rectifying diode Do1 and the cathode of the rectifying diode Do2 through the secondary side series resonance capacitor C2A connected in series with the secondary winding portion N2A. Also, the end portion of the secondary winding N2 on the secondary winding portion N2B side is connected to the node between the anode of the rectifying diode Do3 and the cathode of the rectifying diode Do4 through the secondary side series resonance capacitor C2B connected in series with the secondary winding portion N2B.

The cathodes of the rectifying diodes Do1 and Do3 are connected to the positive-polarity terminal of the smoothing capacitor Co. The negative-polarity terminal of the smoothing capacitor Co is connected to the secondary side earth. Also, the anodes of the rectifying diodes Do2 and Do4 are connected to the secondary side earth.

In the connection form described above, a first voltage doubler half-wave smoothing circuit is structured which includes the first secondary side series resonance circuit and which is structured by the secondary winding portion N2A, the secondary side series resonance capacitor C2A, the rectifying diodes Do1 and Do2, and the smoothing capacitor Co. Also, a second voltage doubler half-wave rectifying circuit is formed which includes the second secondary side series resonance circuit and which is structured by the secondary winding portion N2B, the second side series resonance capacitor C2B, the rectifying diodes Do1 and Do2, and the smoothing capacitor Co.

The first voltage doubler half-wave rectifying circuit performs the rectifying operation by using a rectification current path during a time period of one-polarity half period of the AC voltage induced in the secondary winding N2, thereby charging the secondary side series resonance capacitor C2A with the rectified current based on the potential of the AC voltage of the secondary winding portion N2A. In this case, the rectification current path is as follows: "the secondary winding portion N2A→the rectifying diode Do2→the secondary side series resonance capacitor C2A→the secondary winding portion N2A." On the other hand, the first voltage doubler half-wave rectifying circuit performs the rectifying operation by using a rectification current path during a time period of the other-polarity half period of the AC voltage induced therein, thereby charging the smoothing capacitor Co with the rectified current based on the potential obtained by superimposing the voltage across the secondary side series resonance capacitor C2A on the AC voltage in the secondary winding N2A. In this case, the rectification current path is as follows: "the secondary winding portion N2A→the secondary side series resonance capacitor C2A→the rectifying diode Do1→the smoothing capacitor Co→the secondary winding portion N2A."

In addition, the second voltage doubler half-wave rectifying circuit performs the rectifying operation by using a rectification current path during a time period of the other polarity-half period, thereby charging the secondary side series resonance capacitor C2B with the rectified current based on the potential of the AC voltage in the secondary winding portion N2A. In this case, the rectification current path is as follows: "the secondary winding portion N2B→the rectifying diode Do4→the secondary side series resonance capacitor C2B→the secondary winding portion N2B." On the other hand, the second voltage doubler half-wave rectifying circuit performs the rectifying operation by using a rectification current path during a time period of the one polarity-half period, thereby charging the smoothing capacitor Co with the rectified current based on the potential obtained by superimposing the voltage across the secondary side series resonance capacitor C2B on the AC voltage in the secondary winding N2B. In this case, the rectification current path is as follows: "the secondary winding portion N2B→the secondary side series resonance capacitor C2B→the rectifying diode Do3→the smoothing capacitor Co→the secondary winding portion N2B."

According to the rectifying operation described above during the one-polarity half period of the AC voltage in the secondary winding N2, the smoothing capacitor Co is charged with the rectified current based on the potential obtained by superimposing the voltage across the secondary side series resonance capacitor C2B on the induced voltage in the secondary winding portion N2B. On the other hand, during the other-polarity half period of the AC voltage in the secondary winding N2, the smoothing capacitor Co is charged with the rectified current based on the potential obtained by superimposing the voltage across the secondary side series resonance capacitor C2A on the induced voltage in the secondary winding portion N2A. As a result, the level corresponding to double that of the induced voltage in the secondary winding portion N2A or N2B is obtained as the secondary side DC output voltage Eo as the voltage across the smoothing capacitor Co. That is to say, the voltage doubler full-wave rectifying circuit is obtained.

Figure 7:
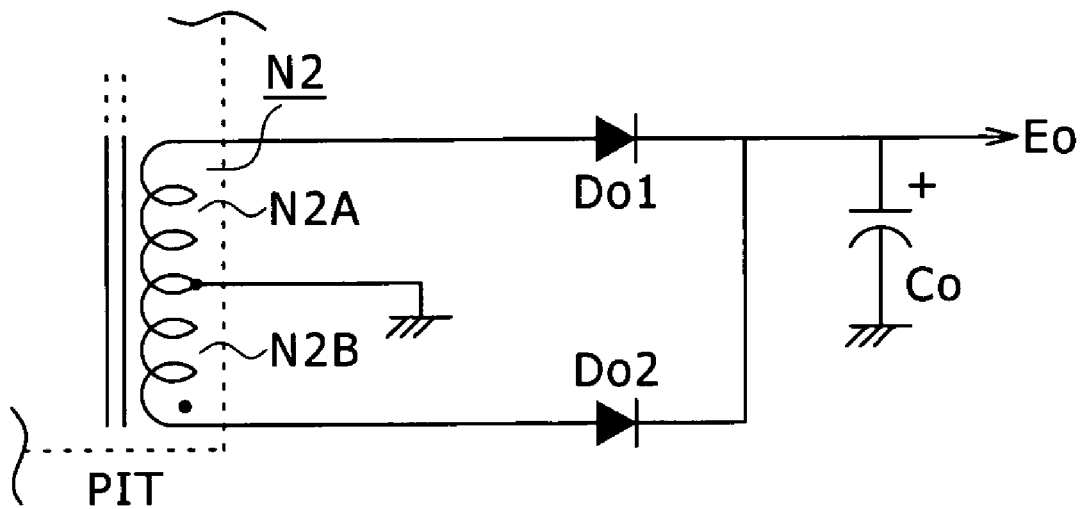
FIG. 7 is a circuit diagram showing still another modified structural example of the secondary side corresponding to each of the power supply circuits according to the first and second embodiments of the present invention.

A circuit shown in FIG. 7 includes a double-wave rectifying circuit as the secondary side rectifying circuit. The double-wave rectifying circuit in this case is structured as follows.

Firstly, a center tap is provided in the secondary winding N2, thereby separating the secondary winding N2 into secondary winding portions N2A and N2B with the center tap as a boundary. The center tap is connected to the secondary side earth.

In addition, in this case, the circuit includes two rectifying diodes Do1 and Do2, and one smoothing capacitor Co as component elements for forming the double-wave rectifying circuit. An anode of the rectifying diode Do1 is connected to an end portion, of the secondary winding N2, on the secondary winding portion N2A side. An anode of the rectifying diode Do2 is connected to an end portion, of the secondary winding N2, on the secondary winding portion N2B side. Cathodes of the rectifying diodes Do1 and Do2 are connected to the positive-polarity terminal of the smoothing capacitor Co. The negative-polarity terminal of the smoothing capacitor Co is connected to the center tap of the secondary winding N2 at the secondary side earth potential.

In the secondary side double-wave rectifying circuit thus structured, during a one-polarity half period of the secondary winding voltage V3 induced in the secondary winding N2, a rectified current is caused to flow through a path of the secondary winding portion N2A→the rectifying diode Do1→the smoothing capacitor Co, thereby charging the smoothing capacitor Co with the rectified current. On the other hand, during the other-polarity half period of the secondary winding voltage V3, a rectified current is caused to flow through a path of the secondary winding portion N2B→the rectifying diode Do2→the smoothing capacitor Co, thereby charging the smoothing capacitor Co with the rectified current. In such a manner, the double-wave rectifying operation for charging the smoothing capacitor Co with the rectified current is performed in correspondence to the positive and negative half periods of the secondary winding voltage. As a result, the secondary side DC output voltage Eo having the level corresponding to an equimultiple of that of the induced voltage in the secondary winding portion N2A or N2B is obtained as the voltage across the smoothing capacitor Co.

The change of FIG. 7 shows the structure in which no secondary side series resonance capacitor is provided in correspondence to that the double-wave rectifying circuit is structured as the secondary side rectifying circuit. At that, for confirmation, as led from the description until now, even when the power supply circuit is structured so as not to includes the secondary side series resonance circuit as shown in FIGS. 7 and 8, the abnormal operation in which no ZVS is obtained during the intermediate load phase is dissolved, and the normal switching operation is obtained over the overall range of the corresponding load power in terms of this embodiment.

Figure 8:
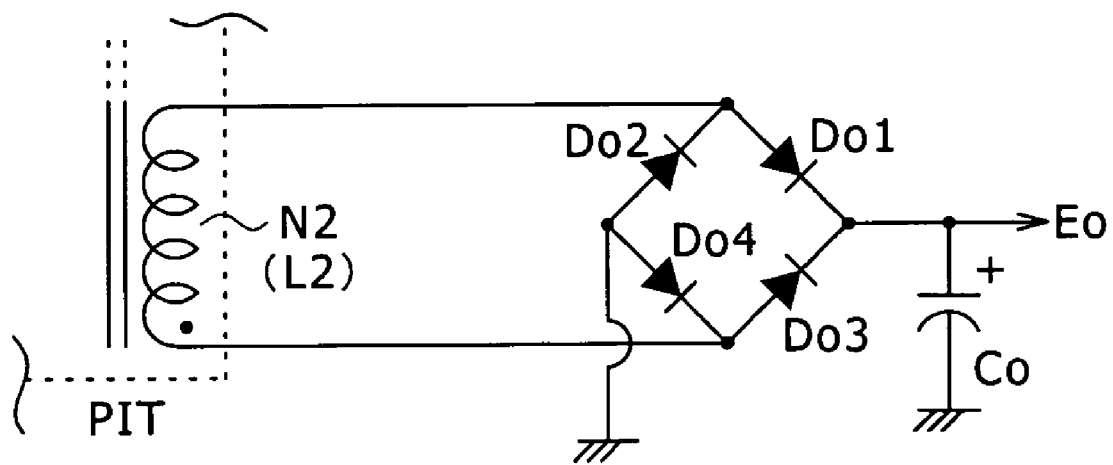
FIG. 8 is a circuit diagram showing yet another modified structural example of the secondary side corresponding to each of the power supply circuits according to the first and second embodiments of the present invention.

In terms of the secondary side rectifying circuit, the secondary side series resonance capacitor C2 is omitted in a circuit shown in FIG. 8 and the circuit shown in FIG. 8 includes a bridge full-wave rectifying circuit. Since a circuit structure itself of the bridge full-wave rectifying circuit is the same as that shown in FIG. 5, a description thereof is omitted here.

Figure 9:
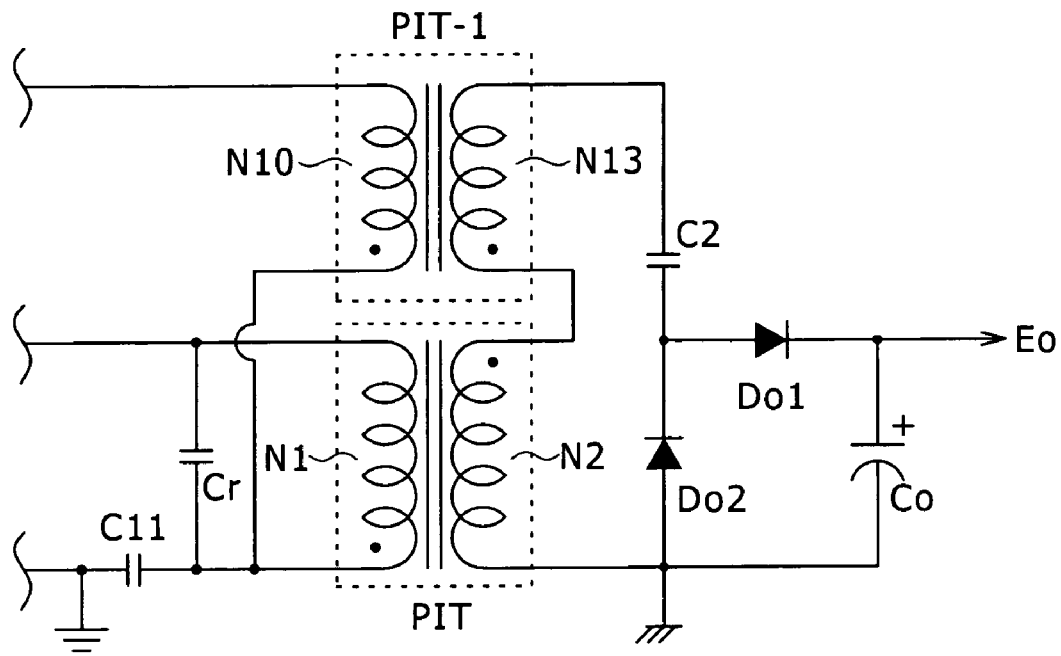
FIG. 9 is a circuit diagram showing a modified structural example corresponding to the power supply circuit according to the second embodiment of the present invention.
Figure 10:
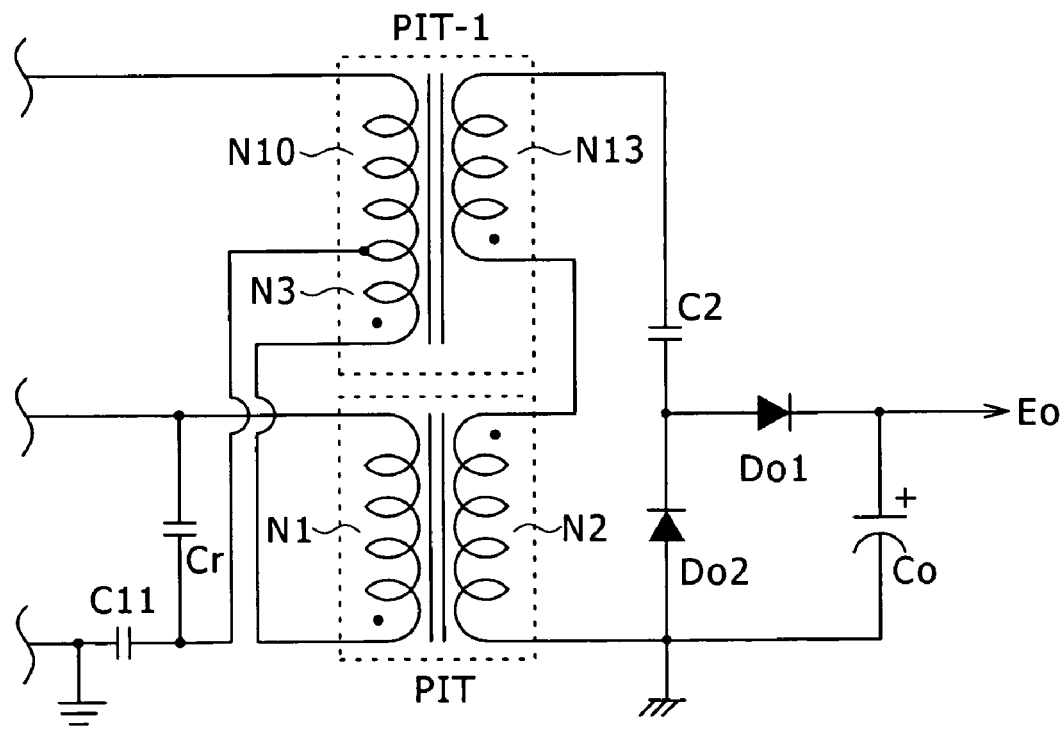
FIG. 10 is a circuit diagram showing another modified structural example corresponding to the power supply circuit according to the second embodiment of the present invention.

Subsequently, FIGS. 9 and 10 show changes of primary and secondary side power transmitting portions in the power supply circuit of the second embodiment, respectively. It should be noted that while illustration of the noise filter (CMC, CL, CL) for the commercial AC power source AC, the rectifying and smoothing circuit (Di, Ei) for rectifying and, smoothing the AC voltage from the commercial AC power source AC, the switching element Q1, the control circuit 1, and the oscillation/drive circuit 2 is omitted in these figures, these constituent elements are connected to predetermined circuit constituent elements shown in FIGS. 9 and 10 in accordance with the circuit structure shown in FIG. 3.

The circuit shown in FIG. 9 is provided with the insulating converter transformer PIT in which the primary winding N1 and the secondary winding N2 are wound, respectively, and the insulating converter transformer PIT-1. The primary winding N1 and the secondary winding N2 are wound in the insulating converter transformer PIT in a state of being insulated from each other in terms of a DC form. In the insulating converter transformer PIT-1, the choke coil winding N10 is wound around the primary side by the predetermined number of turns, and a secondary side superimposing winding N13 is wound around the secondary side by the predetermined number of turns. In addition, the choke coil winding N10 and the secondary side superimposing winding N13 are wound in a state of being insulated from each other in terms of a DC form.

The winding finish end portion of the choke coil winding N10 is connected to the positive-polarity terminal of the smoothing capacitor Ci (not shown). The winding start end portion of the choke coil winding N10 is connected to a node among the winding start end portion of the primary winding N1, the one-polarity end portion of the primary side parallel resonance capacitor Cr, and the one-polarity end portion of the primary side series resonance capacitor C11.

A winding start end portion of the secondary side superimposing winding N13 is connected to the winding start end portion of the secondary winding N2, and a winding finish end portion thereof is connected to the one-polarity end portion of the secondary side series resonance capacitor C2. That is to say, on the secondary side of the power supply circuit in this case, the secondary side series resonance capacitor C2 is further connected in series with the series combination of the secondary side superimposing winding N13 and the secondary winding N2. Then, a secondary side series resonance circuit is structured by a composite inductance of the inductances the secondary side superimposing winding N13 and second winding N2, and the capacitance of the secondary side series resonance capacitor C2. In addition, the voltage doubler half-wave rectifying circuit is provided so as to include the secondary side series resonance capacitor C2 of the secondary side series resonance circuit.

With such a structure, the resonance pulse voltage generated in the choke coil winding N10 is also induced in the secondary side superimposing winding N13 through the magnetic coupling in the insulating converter transformer PIT-1. The resulting induced voltage is superimposed on the AC voltage in the secondary winding N2 which is connected in series with the secondary side superimposing winding N13. As a result, the level of the AC voltage generated in the secondary winding N2 increases to provide the operation for reducing the current as well caused to flow in correspondence to the second side rectifying operation. As a result, the switching loss, the conduction loss and the like in the rectifying diodes and other components on the secondary side are reduced, which contributes to enhancement of the power conversion efficiency.

Next, in the case of the circuit structure shown in FIG. 10, a primary side superimposing winding N3 is further provided for the circuit structure shown in FIG. 9. The primary side superimposing winding N3 is provided so as to be additionally wound around the winding start end portion side of the choke coil winding N10. In this case, an end portion of the choke coil winding N10 on the side of being connected to the primary superimposing winding N3 is connected to a node between the one-polarity end portion of the primary side parallel resonance capacitor Cr, and the one-polarity end portion of the primary side series resonance capacitor C11. An end portion of the primary side superimposing winding N3 on the side of not being connected to the choke coil winding N10 is connected to the winding start end portion of the primary winding N1. The degree of coupling, between the choke coil N10 and the primary side superimposing winding N3, for example, is expressed by the coupling coefficient k of about 0.99. Thus, a state of the magnetic tight coupling is obtained.

With this circuit structure, in the insulating converter transformer PIT-1, the resonance pulse voltage generated in the choke coil winding N10 is induced in the primary side superimposing winding N3. Also, the, resonance pulse voltage induced in the primary side superimposing winding N3 is superimposed on the primary winding voltage V2. As a result, firstly, an effect of reducing the power loss on the primary side resulting from an increase in level of the primary winding voltage V2 is generated in the primary winding voltage V2 similarly to the case described with reference to FIG. 1. At the same time, there is generated an effect of reducing the power loss on the secondary side resulting from an increase in secondary winding voltage level due to provision of the secondary side superimposing winding N13. This effect is also described with reference to FIG. 9. Thus, in the case as well of the circuit shown in FIG. 10, the power conversion efficiency is enhanced.

In addition, when the circuit structure shown in FIG. 10 is adopted, a first primary side parallel resonance circuit can be regarded as being structured based on a parallel combination of a series connection circuit of the choke coil winding N10, the primary side superimposing winding N3 and the primary winding N1, and a series connection circuit of the primary side parallel resonance capacitor Cr and the primary side series resonance capacitor C11. From this, the primary side superimposing winding N3 can be regarded as an extension of the choke coil winding N10 and thus can be treated as the first inductor in the present invention.

In addition, a second primary side parallel resonance circuit is structured based on a parallel combination of the series connection circuit of the primary winding N1 and the primary side superimposing winding N3, and the primary side parallel resonance capacitor Cr.

In addition, a first series resonance circuit is structured based on a series combination of the primary winding N1, the primary side superimposing winding N3, and the primary side series resonance capacitor C11. A second series resonance circuit is structured based on a series combination of the choke coil winding N10 and the primary side series resonance capacitor C11.

At that, while a description based on illustration is omitted here, the power supply circuit may include a partial voltage resonance capacitor so as to structure a partial voltage resonance circuit at least on the secondary side in terms of this embodiment. In this case, a secondary side partial voltage resonance circuit is structured by at least the leakage inductance L2 of the secondary winding N2 and the capacitance of the partial voltage resonance capacitor. Also, the secondary side partial voltage resonance circuit performs a partial voltage resonance operation at timing of turn-ON/turn-OFF of the secondary side rectifying diode. A current which is intended to be caused to flow through the secondary side rectifying diode is caused to flow through the secondary side partial voltage resonance capacitor based on the partial voltage resonance operation. As a result, the conduction loss and the switching loss in the rectifying diodes are reduced.

In addition, the present invention is not limited to the constitution which is shown in the form of the first and second embodiments. For example, the circuit structure of the details of the primary side switching converter, the structure of the secondary side rectifying circuit, and the like are devised in the form of other structures.

In addition, a device such as an insulated gate bipolar transistor (IGBT) or a bipolar transistor other than an MOS-FET is selected as a main switching element (and an auxiliary switching element). Also, while the separate excitation type switching converter is given in the first and second embodiments, the present invention can be applied when a self-excitation type switching converter is structured.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A switching power supply circuit, comprising:
a rectifying and smoothing circuit including a rectifying element and a smoothing capacitor, the rectifying element rectifying an AC voltage input from a commercial AC power source to produce a rectified voltage, and the smoothing capacitor smoothing the rectified voltage to generate a rectified and smoothed voltage as a voltage across the smoothing capacitor;
a switching element for receiving the rectified and smoothed voltage as a DC input voltage to perform a switching operation;
a switching driving section operable to drive the switching element to perform the switching operation;
a first inductor disposed in a path through which the rectified and smoothed voltage is input to the switching element;
a first primary side series resonance circuit for performing a resonance operation in correspondence with the switching operation performed by the switching element, the first primary side series resonance circuit including an inductance of a second inductor and a capacitance of a primary side series resonance capacitor connected in series with the inductance of the second inductor;
a second primary side series resonance circuit for performing a resonance operation in correspondence with the switching operation performed by the switching element, the second primary side series resonance circuit including an inductance of the first inductor and the capacitance of the primary side series resonance capacitor connected in series with the inductance of the first inductor;
a first primary side parallel resonance circuit for performing a resonance operation in correspondence with the switching operation performed by the switching element, the first primary side parallel resonance circuit including the inductance of the first inductor, the inductance of the second inductor connected in series with the inductance of the first inductor, and a capacitance of a primary side parallel resonance capacitor connected in parallel with a series connection circuit including the first inductor and the second inductor;
a converter transformer having a core with a primary winding on a primary side and a secondary winding on a secondary side, the primary winding being formed by the second inductor, the secondary winding having an AC voltage induced therein by the primary winding, a coupling coefficient between the primary side and the secondary side being set for loose coupling; and
a secondary side DC output voltage generating section operable to perform a rectifying operation on the AC voltage induced in the secondary winding of the converter transformer and input to the secondary side DC output voltage generating section to thereby generate a secondary side DC output voltage.

2. The switching power supply circuit according to claim 1, further comprising a constant voltage control section operable to perform constant voltage control on the secondary side DC output voltage by controlling the switching driving section to a level of the secondary side DC output voltage to adjust a switching frequency of the switching element.

3. The switching supply source circuit according to claim 1, further comprising a secondary side series resonance circuit for performing resonance in correspondence with the rectifying operation, the secondary side series resonance circuit including a secondary side series resonance capacitor connected in series with the secondary winding of the converter transformer.

4. The switching power supply circuit according to claim 1, wherein the converter transformer includes a compound transformer having the first inductor compounded therein.

5. The switching power supply circuit according to claim 4, wherein the compound transformer further comprises:
an EE type core including two E-shaped cores each having magnetic legs, the E-shaped cores being arranged so that the magnetic legs face each other, the EE type core forming the converter transformer, the primary winding and the secondary winding being wound around the two E-shaped cores;
a third E-shaped core forming the first inductor and having magnetic leg end faces facing the EE type core; and
a winding wound around the third E-shaped core.

6. A switching power supply circuit, comprising:
a switching element operable to receive a DC input voltage and to perform a switching operation;
a switching driving section operable to drive the switching element to perform the switching operation;
a first inductor and a second inductor arranged in series with a path through which the DC input voltage is input to the switching element;
a first primary side series resonance circuit and a second primary side series resonance circuit for performing resonance operations in correspondence with the switching operation performed by the switching element, the first primary side series resonance circuit and the second primary side series resonance circuit including a primary side series resonance capacitor connected in series with the first inductor and the second inductor;
a primary side parallel resonance circuit for performing a resonance operation in correspondence with the switching operation performed by the switching element, the primary side parallel resonance circuit including a primary side parallel resonance capacitor connected in parallel with the second inductor or the switching element;
a converter transformer having a core with a primary winding on a primary side and a secondary winding on a secondary side, the primary winding being formed by the second inductor, the secondary winding having an AC voltage induced therein by the primary winding, a coupling coefficient between the primary side and the secondary side being set for loose coupling; and a secondary side DC output voltage generating section operable to perform a rectifying operation on the AC voltage induced in the secondary winding of the converter transformer and input to the secondary side DC output voltage generating section to thereby generate a secondary side DC output voltage.

7. The switching power supply circuit according to claim 6, further comprising a constant voltage control section operable to perform constant voltage control on the secondary side DC output voltage by controlling the switching driving section according to a level of the secondary side DC output voltage to adjust a switching frequency of the switching element.

8. The switching power supply circuit according to claim 6, further comprising a secondary side series resonance circuit for performing resonance in correspondence with the rectifying operation, the secondary side series resonance circuit including a secondary side series resonance capacitor connected in series with the secondary winding of the converter transformer.

9. The switching power supply circuit according to claim 6, wherein the converter transformer includes a compound transformer having the first inductor compounded therein.

10. The switching power supply circuit according to claim 9, wherein the compound transformer further comprises:

an EE type core including two E-shaped cores each having magnetic legs, the E-shaped cores being arranged so that the magnetic legs face each other, the EE type core forming the converter transformer, the primary winding and the secondary winding being wound around the two E-shaped cores; and a third E-shaped core forming the first inductor and having magnetic leg end faces facing the EE type core; and a winding wound around the third E-shaped core.

* * * * *

UNITED STATES PATENT AND TRADEMARK OFFICE
CERTIFICATE OF CORRECTION

PATENT NO. : 7,286,374 B2  Page 1 of 1
APPLICATION NO. : 11/449209
DATED : October 23, 2007
INVENTOR(S) : Masayuki Yasumura It is certified that error appears in the above-identified patent and that said Letters Patent is hereby corrected as shown below:

In Column 9, Line 3, "it is possible to obtain. Affects" should read --it is possible to obtain affects--;
In Column 9, Line 50, delete "," after "showing";
In Column 10, Line 18, delete "," after "example";
In Column 10, Line 32, delete "," after "characteristics";
In Column 13, Line 53, delete "," after "of";
In Column 13, Line 54, delete "," after "for";
In Column 17, Line 11, "L10 for example" should read --L10, for example,--;
In Column 20, Line 3, delete "," after "are";
In Column 20, Line 24, delete "," after "is";
In Column 20, Line 28, "letter like" should read --letter-like--;
In Column 23, Line 24, delete "," after "may";
In Column 25, Line 59, delete "." after "input";
In Column 29, Line 36, delete "," after "being";
In Column 35, Line 35, delete "," after "formerly"; and
In Column 37, Line 37, delete "," after "supply".

Signed and Sealed this

Sixteenth Day of September, 2008

JON W. DUDAS
*Director of the United States Patent and Trademark Office*